(12) United States Patent
Brown et al.

(10) Patent No.: US 11,199,240 B2
(45) Date of Patent: Dec. 14, 2021

(54) FLUID DAMPER FOR A BICYCLE COMPONENT

(71) Applicant: SRAM, LLC, Chicago, IL (US)

(72) Inventors: Joshua Brown, Chicago, IL (US); Brian Jordan, Highland Park, IL (US); Christopher Shipman, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 352 days.

(21) Appl. No.: 15/702,161

(22) Filed: Sep. 12, 2017

(65) Prior Publication Data

US 2018/0274623 A1    Sep. 27, 2018

Related U.S. Application Data

(63) Continuation-in-part of application No. 15/470,357, filed on Mar. 27, 2017, now Pat. No. 10,435,111.

(51) Int. Cl.
| | |
|---|---|
| *F16F 9/50* | (2006.01) |
| *F16F 9/10* | (2006.01) |
| *F16F 9/34* | (2006.01) |
| *B62M 9/122* | (2010.01) |
| *B62M 9/126* | (2010.01) |
| *B62M 9/16* | (2006.01) |
| *B62M 9/128* | (2010.01) |

(52) U.S. Cl.
CPC ............... *F16F 9/50* (2013.01); *B62M 9/122* (2013.01); *B62M 9/126* (2013.01); *B62M 9/128* (2013.01); *B62M 9/16* (2013.01); *F16F 9/10* (2013.01); *F16F 9/34* (2013.01)

(58) Field of Classification Search
CPC ...... B62M 9/16; B62M 9/126; B62M 9/1248; B62M 9/122; F16H 2007/081
USPC ........................................................ 474/80, 82
See application file for complete search history.

(56) References Cited

U.S. PATENT DOCUMENTS

| | | | | |
|---|---|---|---|---|
| 4,406,643 A | * | 9/1983 | Shimano ................ | B62M 9/126 474/80 |
| 4,563,167 A | * | 1/1986 | Foster ................... | F16H 7/1236 474/115 |

(Continued)

FOREIGN PATENT DOCUMENTS

| | | |
|---|---|---|
| CN | 103387035 | 11/2013 |
| CN | 103707994 A | 4/2014 |

(Continued)

*Primary Examiner* — Henry Y Liu

(57) ABSTRACT

A bicycle rear derailleur has a base member mountable to a bicycle frame, a movable member movably coupled to the base member, a chain guide assembly rotatably connected to the movable member for rotation about a rotational axis, a biasing element configured and arranged to bias the chain guide assembly for rotation in a first rotational direction with respect to the movable member, and a fluid damper having a fluid cavity containing a volume of fluid. The fluid damper is operatively disposed between the chain guide assembly and the movable member to apply a damping force to the chain guide assembly when the chain guide assembly rotates in a second rotational direction opposite to the first rotational direction. The fluid damper has a guide wheel configured to route a chain and rotatable about the rotational axis.

18 Claims, 29 Drawing Sheets

(56) References Cited

U.S. PATENT DOCUMENTS

| | | | | |
|---|---|---|---|---|
| 5,152,720 | A * | 10/1992 | Browning | B62M 9/1242 474/80 |
| 5,924,947 | A * | 7/1999 | Williams | F16H 7/1236 474/133 |
| 6,135,904 | A * | 10/2000 | Guthrie | B62M 9/122 474/82 |
| 6,165,091 | A * | 12/2000 | Dinca | F16F 9/145 474/101 |
| 6,638,190 | B2 * | 10/2003 | Patterson | B62M 9/122 474/78 |
| 8,202,182 | B2 | 6/2012 | Ishikawa et al. | |
| 8,744,699 | B2 | 6/2014 | Yamaguchi et al. | |
| 8,852,041 | B2 | 10/2014 | Yamaguchi et al. | |
| 8,870,692 | B2 | 10/2014 | Yamaguchi et al. | |
| 8,870,693 | B2 | 10/2014 | Shahana et al. | |
| 8,882,618 | B2 * | 11/2014 | Yamaguchi | B62M 9/122 474/80 |
| 8,900,078 | B2 * | 12/2014 | Yamaguchi | B62M 9/1244 474/80 |
| 9,187,149 | B2 | 11/2015 | Yamaguchi | |
| 9,228,643 | B2 * | 1/2016 | Yamaguchi | F16H 7/1227 |
| 9,290,235 | B2 * | 3/2016 | Yamaguchi | B62M 9/1244 |
| 9,377,089 | B2 * | 6/2016 | Yamaguchi | F16H 7/0829 |
| 9,463,846 | B2 * | 10/2016 | Chang | B62M 9/121 |
| 9,475,547 | B2 * | 10/2016 | Jordan | B62M 9/1248 |
| 9,669,900 | B2 * | 6/2017 | Shirai | B62M 9/16 |
| 9,751,590 | B2 * | 9/2017 | Shipman | B62M 9/126 |
| 10,189,542 | B2 * | 1/2019 | Wu | B62M 9/1242 |
| 2003/0216205 | A1 * | 11/2003 | Meckstroth | F16H 7/1227 474/135 |
| 2007/0219029 | A1 * | 9/2007 | Turner | B62M 9/16 474/80 |
| 2008/0026890 | A1 * | 1/2008 | Oseto | B62M 9/1242 474/82 |
| 2008/0026891 | A1 * | 1/2008 | Oseto | B62M 9/1242 474/82 |
| 2009/0054183 | A1 * | 2/2009 | Takachi | B62M 9/121 474/80 |
| 2009/0291789 | A1 * | 11/2009 | Ishikawa | B62M 9/1248 474/82 |
| 2012/0083371 | A1 * | 4/2012 | Yamaguchi | B62M 9/126 474/80 |
| 2012/0083372 | A1 * | 4/2012 | Yamaguchi | B62M 9/126 474/80 |
| 2012/0142466 | A1 * | 6/2012 | Lin | B62M 9/124 474/80 |
| 2012/0258827 | A1 | 10/2012 | Ishikawa et al. | |
| 2013/0090195 | A1 * | 4/2013 | Yamaguchi | B60T 7/102 474/80 |
| 2013/0090196 | A1 * | 4/2013 | Yamaguchi | B62M 9/122 474/80 |
| 2013/0203532 | A1 * | 8/2013 | Jordan | B62M 9/1248 474/82 |
| 2013/0288834 | A1 * | 10/2013 | Yamaguchi | B62M 9/126 474/80 |
| 2013/0310204 | A1 * | 11/2013 | Shahana | B62M 9/121 474/80 |
| 2014/0162817 | A1 * | 6/2014 | Yamaguchi | B62M 9/122 474/80 |
| 2014/0296009 | A1 * | 10/2014 | Suyama | B62M 9/122 474/80 |
| 2014/0371013 | A1 * | 12/2014 | Yamaguchi | B62M 9/1244 474/122 |
| 2015/0072816 | A1 * | 3/2015 | Yamaguchi | F16H 7/0829 474/113 |
| 2015/0072817 | A1 * | 3/2015 | Yamaguchi | F16H 7/1227 474/113 |
| 2016/0046352 | A1 * | 2/2016 | Shipman | B62M 9/126 474/80 |
| 2016/0304161 | A1 * | 10/2016 | Shirai | B62M 9/16 |

FOREIGN PATENT DOCUMENTS

| | | |
|---|---|---|
| CN | 104443238 | 3/2015 |
| CN | 104443239 | 3/2015 |
| CN | 106043588 | 10/2016 |
| DE | 3829479 | 3/1989 |
| DE | 102004055329 | 5/2006 |
| DE | 102007040156 A1 | 2/2009 |
| DE | 102011114699 A1 | 4/2012 |
| DE | 202007019470 U1 | 11/2012 |
| DE | 102013001952 A1 | 8/2013 |
| JP | H02169383 | 6/1990 |
| JP | H02296024 A | 12/1990 |
| JP | H0544761 A | 2/1993 |
| JP | H06159458 | 6/1994 |
| JP | H07301272 A | 11/1995 |
| JP | H03267027 A | 11/1997 |
| JP | H1182593 A | 3/1999 |
| JP | 2008008418 A | 1/2008 |
| TW | M481882 U | 7/2014 |
| TW | 201509746 | 3/2015 |
| TW | 201509748 | 3/2015 |
| TW | 201636264 | 10/2016 |
| WO | 2007106867 A2 | 9/2007 |

* cited by examiner

FLUID DAMPER FOR A BICYCLE COMPONENT

BACKGROUND

1. Field of the Disclosure

The present disclosure is generally directed to bicycle chain tensioner, and more particularly to a fluid damper for a bicycle rear derailleur.

2. Description of Related Art

Bicycle rear derailleurs are well known in the art as a part of a drivetrain of a bicycle. The typical drivetrain also includes a crank assembly that is coupled to one or more sprockets. The crank assembly is operable to drive a chain that is routed or wrapped around one of the sprockets. The chain is also routed to the rear wheel of the bicycle.

Rear derailleurs are provided as a part of the drivetrain to perform two basic functions. The primary function of the rear derailleur is to selectively shift a bicycle chain of the drivetrain among a series of different diameter cogs that are attached to the rear wheel. Shifting of the bicycle chain from one cog to another at the rear wheel is done in order to change the gear ratio of the drivetrain. The secondary function of the rear derailleur is to apply a tension to the chain to take-up slack, as well as to maintain the desired tension, in the chain on the non-drive-side of the drivetrain.

The rear derailleur accomplishes the secondary tensioning function by employing a chain tensioning mechanism known as a cage assembly, or, more commonly, a cage. The cage typically has one or two rotatable cogs or pulleys and the chain is routed or wrapped around the pulleys. The cage is connected to the main body of the rear derailleur in a manner that allows the cage to pivot relative to the main body. The cage is also biased to pivot or rotate in a direction that tensions or applies a tensioning force to the chain.

The cage may also have a first guide member and a second guide member. The first guide member is commonly configured to connect the cage assembly to other components of the rear derailleur. The second guide member is commonly configured so that the one or two rotatable pulleys are sandwiched between the first and second guide members. In this way, the chain may pass between the first and second guide members of the cage while engaging teeth of the pulleys.

When a bicycle travels over smooth terrain, the standard rear derailleur and cage are often sufficient to maintain enough tension in the chain so that the chain does not fall off the sprockets or cogs. However, when a bicycle travels over rough terrain, the forces transmitted to the rear derailleur can cause the cage to undesirably rotate in the chain slackening direction against the biasing force applied to the cage. This creates a slack condition in the chain. A slack chain can lead to the chain slapping against the frame of the bicycle. A slack chain can also lead to the chain falling off the sprockets or cogs.

A solution to this problem is to incorporate a damping system into the chain tensioning part of the derailleur. A damping system is designed to resist cage rotation, particularly in the chain slackening direction. A one-way damping system is configured to resist cage rotation in the chain slackening direction while still allowing free cage rotation in the chain tensioning direction. The typically one-way damping systems work by using a frictional element to provide a damping force in the chain slackening direction of cage rotation. Some of these types of damping systems employ a one-way roller clutch to prevent the frictional element from engaging in the chain tensioning direction.

A problem with these friction type damping systems is that the friction created in the chain slackening direction also makes it more difficult to shift the rear derailleur from a smaller cog to a larger cog at the rear wheel. This difficulty arises because shifting from a smaller cog to a larger cog requires that the cage rotate against the frictional forces of the damper or damping element of the damping system. In the case of a cable actuated rear derailleur, this problem results in a ride experiencing a high or higher shift effort required to change gears. In the case of an electrically actuated rear derailleur, this problem can result in shortening the battery life of the rear derailleur. This is because the actuator or motor of the rear derailleur works harder to overcome the frictional forces of the damping system.

Another problem with friction type damping systems is that the system parts are relatively heavy, which runs counter to a common performance goal of reducing bicycle weight. Still further, friction type damping systems may be rather complicated in construction, requiring multiple parts and numerous manufacturing steps. One result of the complicated nature of friction type damping systems is that the parts are relatively expensive, which increases the cost of the rear derailleurs. Another problem with friction type damping systems is that the friction force is difficult to control resulting in inconsistency across multiple rear derailleur components. Because the friction force is difficult to control, and because of the complicated nature of friction type damping systems, the systems are also difficult to properly assemble and the friction force is difficult to properly establish at the factory.

SUMMARY

In one example, according to the teachings of the present disclosure, a bicycle rear derailleur has a base member mountable to a bicycle frame, a movable member movably coupled to the base member, a chain guide assembly rotatably connected to the movable member for rotation about a rotational axis, a guide wheel rotatable about the rotational axis, a biasing element configured and arranged to bias the chain guide assembly for rotation in a first rotational direction about the rotational axis with respect to the movable member and a fluid damper having a fluid cavity containing a volume of fluid. In this example, the fluid damper is disposed at a connection of the chain guide assembly and the movable member and has a shaft rotatable about the rotational axis and configured to apply a damping force to the chain guide assembly when the chain guide assembly rotates in a second rotational direction opposite to the first rotational direction.

In another example, a bicycle rear derailleur has a base member movably coupled to the base member, the movable member having a fluid cavity configured to contain a volume of fluid. In this example, the bicycle rear derailleur also has a closure mechanism configured to create a seal along a wall of the fluid cavity, a shaft configured to create a seal with an opening of the closure mechanism, a vane disposed on the shaft and configured to interact with the volume of fluid, a bias device configured to bias the shaft in a first rotational direction, a first guide member rotationally fixed to the shaft disposed between the movable member and a freely rotatable guide wheel, a second guide member rotationally fixed to the first guide member such that the guide wheel is disposed between the first and second guide member, and a guide fixing member configured to affix the second guide member to the shaft, the guide fixing member contacting both the second guide member and the shaft.

In yet another example, a fluid damper for a bicycle chain tensioner has a housing couplable to a first portion of a bicycle, the housing defining a fluid cavity therein including a damping chamber and a return chamber and the fluid cavity containing a volume of fluid. In this example, the fluid damper also has a rotational shaft having a first axial end and a second axial end, the rotational shaft supported at the first axial end for rotation about a first rotation axis, and a vane radially extending from the rotational shaft and movable within the fluid cavity about the first rotation axis to define a vane sweep region and dividing the fluid cavity into the damping chamber and the return chamber on opposite sides of the vane. In this example, the fluid damper also has a guide wheel configured to rotatably interact with a bicycle chain, the guide wheel having a second rotation axis, wherein the second rotation axis is within the vane sweep region.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
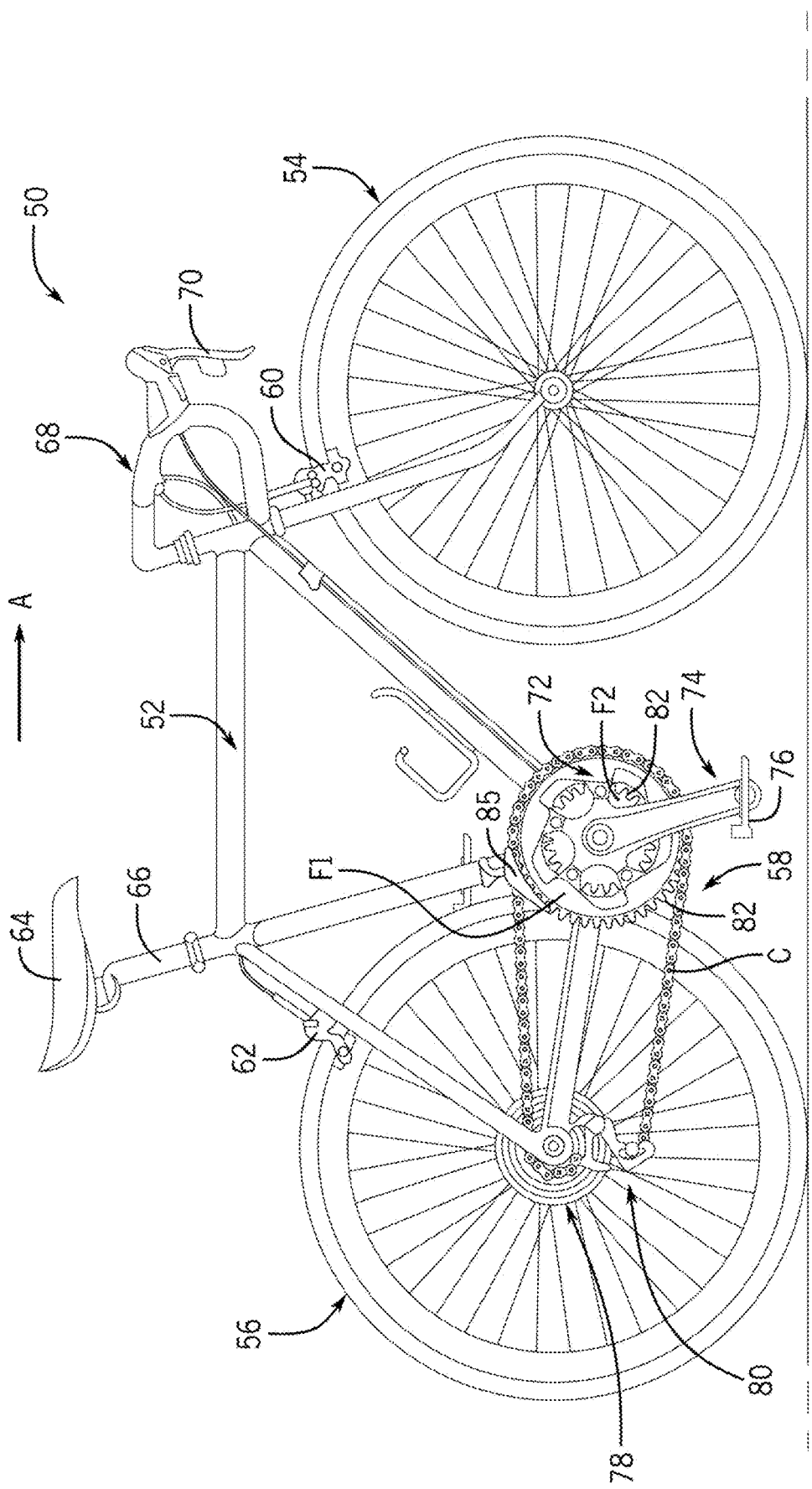
FIG. 1 is a side view of a bicycle, which may be constructed to utilize a fluid damper on the rear derailleur.

The present disclosure provides examples of fluid dampers and bicycle rear derailleurs that solve or improve upon one or more of the above-noted and/or other problems and disadvantages with prior known dampers and derailleurs. The disclosed fluid dampers can replace the traditional friction type, i.e., friction and roller clutch dampers with a fluid damper and one-way valve (i.e. check valve) arrangement. A significant advantage of the disclosed fluid dampers is that the damping forces will be low while shifting, which occurs at low rotational speeds of the cage, and that the damping forces will be high only when the derailleur is subjected to an impact force (for example while riding over rough terrain), which causes high rotational speeds of the cage. Another advantage of the disclosed fluid dampers is that the fluid damper is lighter than a traditional friction-based or friction type damper. Yet another advantage of the disclosed fluid dampers is that the shape and size of the fluid damper may be such that additional clearance is created between the rear derailleur and the heel of a rider's foot, which can reducing the likelihood of the rider's foot colliding with the derailleur.

Examples of one-way fluid dampers and bicycle rear derailleurs that employ such fluid dampers are disclosed and described herein. The disclosed fluid dampers resist cage motion in the chain slackening direction of cage rotation. The disclosed fluid dampers also allow for free rotation of the cage in the chain tensioning direction. Fluid damping torque in the disclosed fluid dampers is proportional to cage rotation velocity. As a result, damping torque applied by the disclosed fluid dampers is low when a rider is shifting gears, and is high only when needed (i.e., during an impact or vibration situation). The disclosed fluid dampers thus can reduce shift effort of a manually operated or actuated rear derailleur and can extend battery life of an electronic rear derailleur. This solves or improves upon the above-noted problem is reduced battery life of higher shifting forces when employing a friction type damper.

The disclosed fluid dampers can reduce the weight of a rear derailleur equipped with such a damper. In one example, the disclosed fluid dampers may reduce the weight of a rear derailleur by about 18 grams in comparison to a mechanical and/or roller clutch based damped equivalent, i.e., a derailleur with a friction type damper. The disclosed fluid dampers can also be relatively small and may be cylindrical in shape, which, when mounted on a rear derailleur, reduces the overall size of the rear derailleur or cage. A damper of smaller size allows for or produces more heel clearance for a rider during use when compared to existing derailleurs with friction type dampers. The foregoing solves or improves upon the problems of excessive weight and heel-to-derailleur contact when employing a friction type damper.

These and other objects, features, and advantages of the disclosed fluid dampers will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 generally illustrates a bicycle 50, which employs a rear derailleur and a fluid damper constructed in accordance with the teachings of the present disclosure. The bicycle 50 includes a frame 52, a front wheel 54 and a rear wheel 56 each rotatably attached to the frame, and a drivetrain 58. A front brake 60 is provided for braking the front wheel 54 and a rear brake 62 is provided for braking the rear wheel 56. The bicycle 50 also generally has a seat 64 near a rear end of the frame 52 and carried on an end of a seat tube 66 connected to the frame. The bicycle also has handlebars 68 near a forward end of the frame 52. A brake lever 70 is carried on the handlebars 68 for actuating one of the front brake 60 or rear brake 62, or both. If one, a second brake lever (not shown) may also be provided to actuate the other brake. A front and/or forward riding direction or orientation of the bicycle 50 is indicated by the direction of the arrow A in FIG. 1. As such, a forward direction of movement for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspension, as well as bicycles with mechanically controlled (e.g. cable, hydraulic, pneumatic) and non-mechanical controlled (e.g. wired, wireless) drive systems.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

Figure 2:
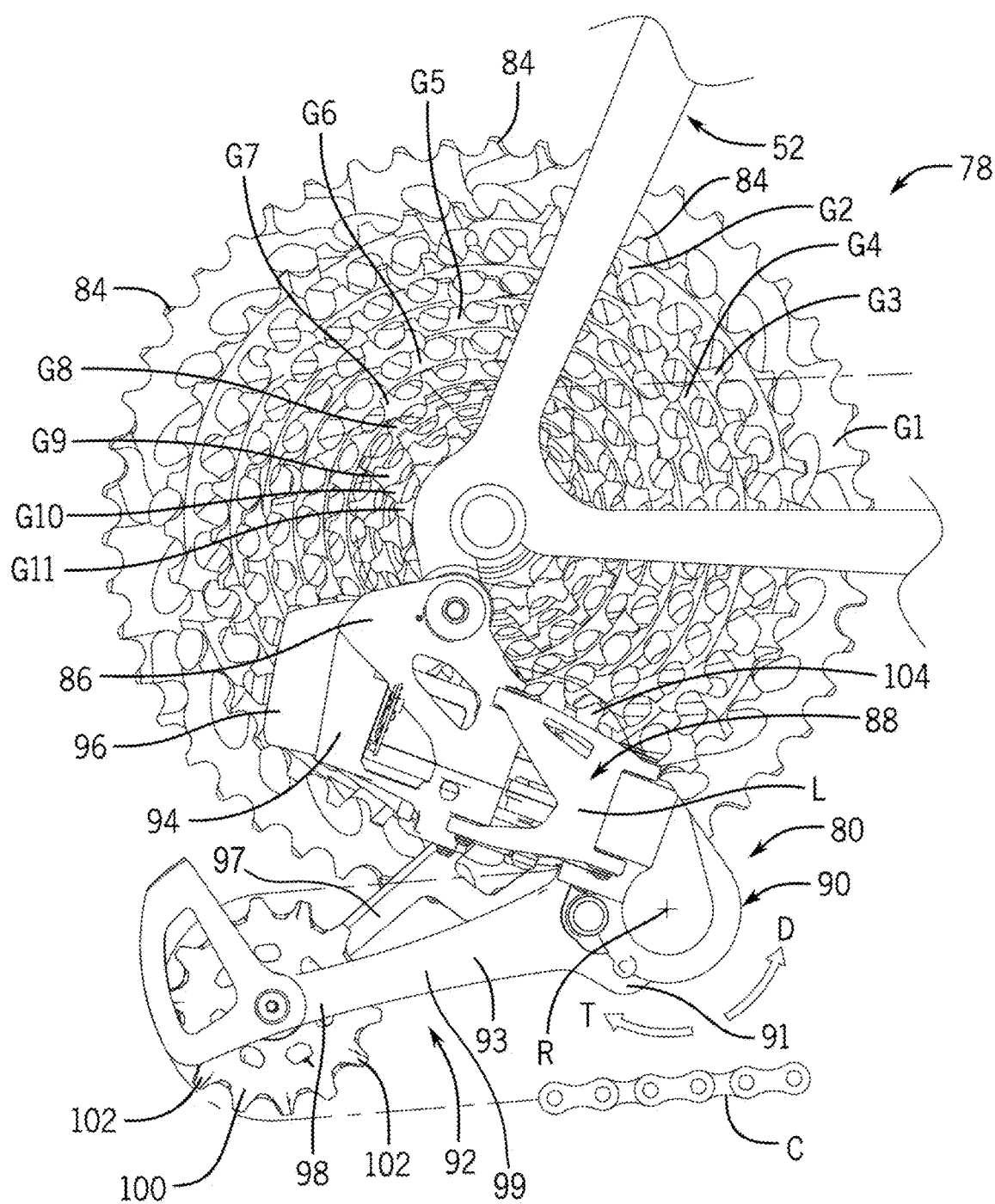
FIG. 2 is a close-up side view of one example of an electronic rear derailleur mounted to a bicycle, the electronic rear derailleur including a fluid damper in accordance with the teachings of the present disclosure.

As is illustrated in FIG. 1, the front sprocket assembly 72 may include one or more coaxially mounted chain rings, gears, or sprockets. In this example, the front sprocket assembly 72 has two such sprockets, F1 and F2, each having teeth 82 around its respective circumference. As shown in FIGS. 1 and 2, the rear sprocket assembly 78 may include a plurality of, such as eleven, coaxially mounted gears, cogs, or sprockets G1-G11. Each sprocket G1-G11 also has teeth 84 arranged around its respective circumference. The number of teeth 82 on the smaller diameter front sprocket F2 is preferably less than the number of teeth on the larger diameter sprocket F1. The numbers of teeth 84 on the rear sprockets G1-G11 typically gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1 and F2. Likewise, the rear derailleur 80 may be operable to move between eleven different operating positions to switch the chain C to a selected one of the rear sprockets G1-G11. In another embodiment, the bicycle may include twelve or thirteen sprockets, and the rear derailleur 80 may be operable to move between any of the twelve or thirteen operating positions, respectively, to switch the chain C to a selected one of the rear sprockets.

Referring to FIG. 2, the rear derailleur 80 is depicted in one example as a wireless, electrically actuated rear derailleur mounted to the frame 52 of the bicycle 50. The electric rear derailleur 80 has a base 86 that is mounted to the bicycle frame 52. A linkage 88 has two links L (one is hidden behind the other in FIG. 2) that are pivotally connected to the base 86. A fluid damper 90, constructed in accordance with the teachings of the present disclosure, is connected to the linkage 88. A chain guide 92 has a cage 93 with a proximal end 91 that is pivotally connected to a part of the fluid damper 90, as described further below. The cage 93 can rotate or pivot about a cage rotation axis R in a damping direction D and a chain tensioning direction T.

The cage 93 may also include a first guide member 99 and a second guide member 97. For instance, the first guide member 99 may be pivotally connected to a part of the fluid damper 90 and the second guide member 97 may be fixed relative to the first guide member 99. The second guide member 97 may also be removable independently from the first guide member 99, for instance to facilitate servicing.

A motor module 94 is carried on the electric rear derailleur 80 and has a battery 96, which supplies power to the motor module. In one example, the motor module 94 is located in the base 86. However, the motor module 94 can instead be located elsewhere, such as in one of the links L of the linkage 88 or in the fluid damper 90. The motor module 94 may include, though not shown herein, a gear mechanism or transmission. As is known in the art, the motor module 94 and gear mechanism may be coupled with the linkage 88 to laterally move the cage 93 and thus switch the chain C among the rear sprockets G1-G11 on the rear sprocket assembly 78.

The cage 93 also has a distal end 98 that carries a tensioner cog or wheel 100. The wheel 100 also has teeth 102 around its circumference. The cage 93 is biased in the chain tensioning direction T to maintain tension in the chain C. The chain guide 92 may also include a second cog or wheel, such as a guide wheel 104 disposed nearer the proximal end of the cage 93 and the fluid damper 90. In operation, the chain C is routed around one of the rear sprockets G1-G11. An upper segment of the chain extends forward to the front sprocket assembly 72 and is routed around one of the front sprockets F1 or F2. A lower segment of the chain C returns from the front sprocket assembly 72 to the tensioner wheel 100 and is then routed forward to the guide wheel 104. The guide wheel 104 directs the chain C to the rear sprockets G1-G11. Lateral movement of the cage 93, tensioner wheel 100, and guide wheel 104 may determine the lateral position of the chain C for alignment with a selected one of the rear sprockets G1-G11.

One or both of the guide wheel 104 and the tensioner wheel 100 may be located between the first guide member 99 and the second guide member 97. The guide wheel 104 may be connected to at least one of the first guide member 99 and the second guide member 97 such that the guide wheel 104 is freely rotatable. The tensioner wheel 100 may be similarly connected such that it is also freely rotatable.

Though not shown herein, a control unit may be mounted to the handlebars 68 for actuating the motor module 94 and operating the rear derailleur 80 for executing gear changes and gear selection. The control unit, however, may be located anywhere on the bicycle 50 or, alternatively, may be distributed among various components of the bicycle, with routing of a communication link to accommodate necessary signal and power paths. The control unit may also be located other than on the bicycle 50, such as, for example, on a rider's wrist or in a jersey pocket. The communication link may include wires, may be wireless, or may be a combination thereof. In one example, the control unit may be integrated with the rear derailleur 80 to communicate control commands between components. The control unit may include a processor, a memory, and one or more communication interfaces.

The battery 96 may instead be an alternate power supply or power source and may operate other electric components of the bicycle 50 within a linked system. The battery 96 or other power supply may also be located in other positions, such as attached to the frame 52. Further, multiple power supplies may be provided, which may collectively or individually power the electric components of the system, including the rear derailleur 80, such as a drive motor for an embodiment involving an electrically powered bicycle. In this example, however, the battery 96 is configured to be attached directly to the rear derailleur 80, and to provide power only to the components of the derailleur.

Figure 3:
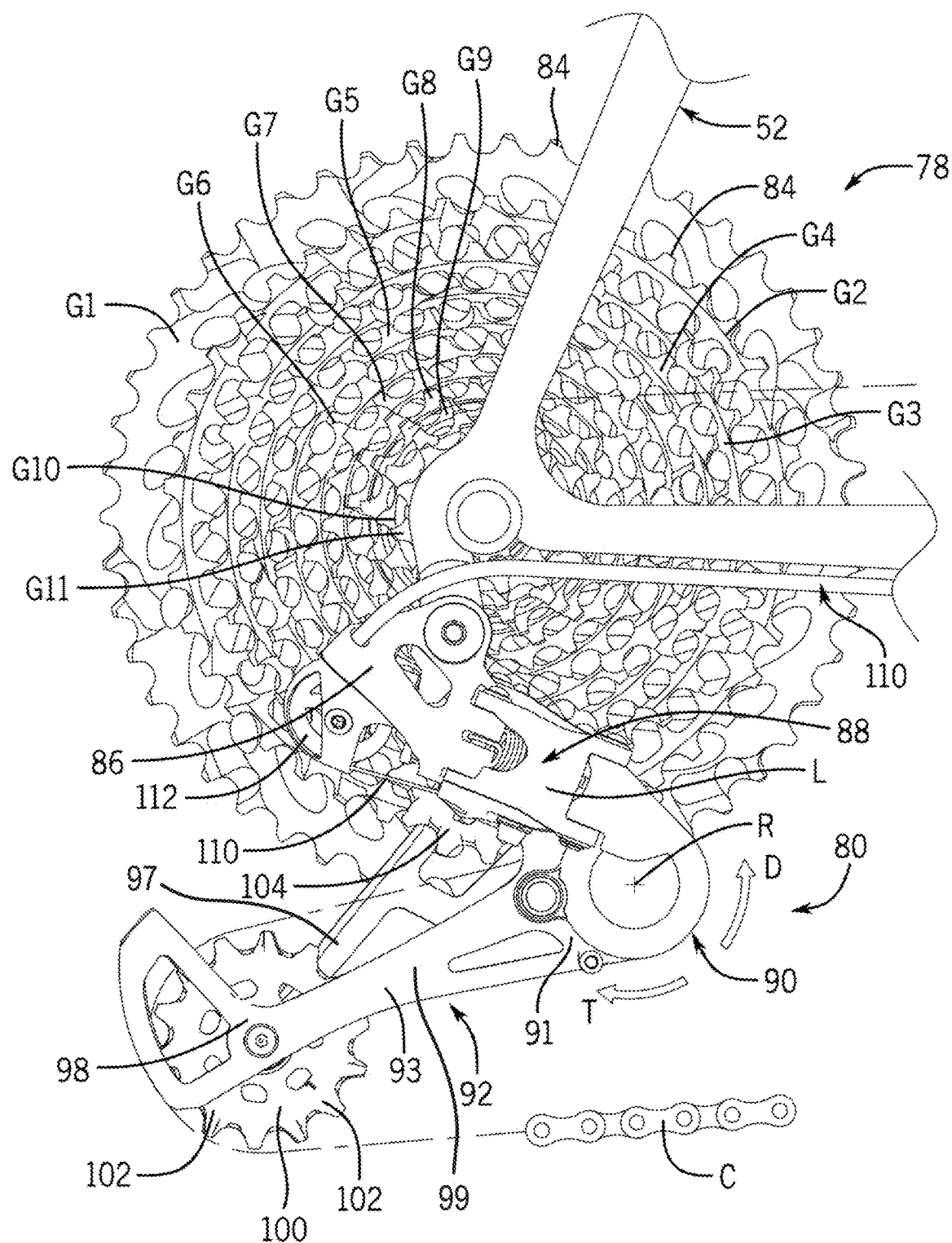
FIG. 3 is a close-up side view of one example of a manually actuated rear derailleur mounted to a bicycle, the manually actuated rear derailleur including a fluid damper in accordance with the teachings of the present disclosure.
Figure 5:
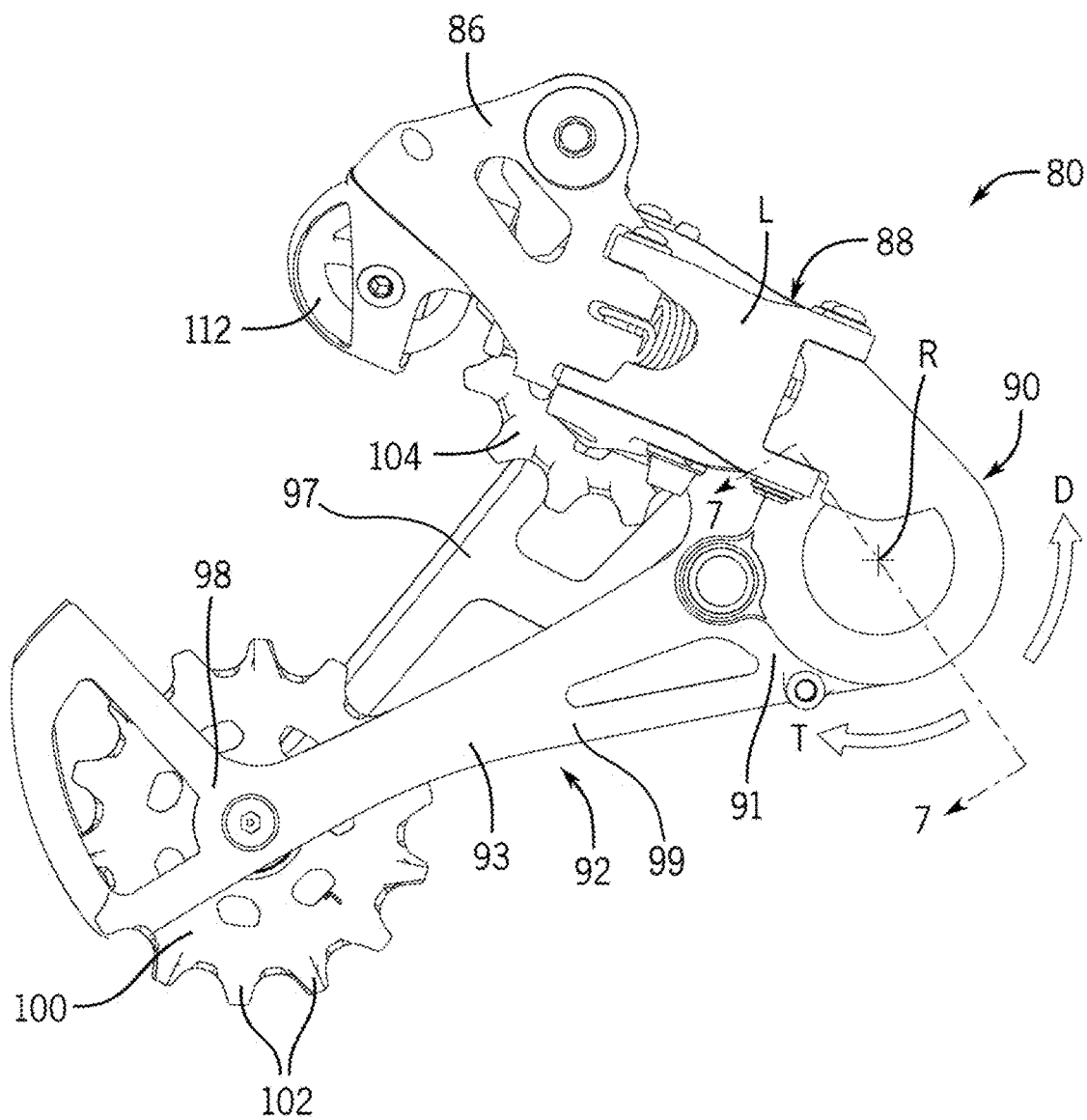
FIG. 5 is the manually actuated rear derailleur of FIG. 3, but not mounted to a bicycle.

Referring to FIG. 3, a cable actuated or manual rear derailleur 80 is shown mounted to the frame 52 of the bicycle 50. FIG. 5 shows the manual rear derailleur 80 but not attached to the bicycle. The manual rear derailleur 80 is substantially the same as the electric rear derailleur and operates in a similar manner, as described above, except for the difference noted below. Thus, the manual rear derailleur 80 includes the base 86 mounted to the bicycle frame 52. The linkage 88 and its two links L is pivotally connected to the base 86. The fluid damper 90 is connected to the links L of the linkage 88. The cage 93 is pivotally connected to the fluid damper 90 and is rotatable about the cage rotation axis R in a damping direction D and a chain tensioning direction T. In this example, an actuator cable 110 is connected to a gear shifter (not shown) that is carried on the handlebars 68 or another part of the bicycle 50. The actuator cable 110 is routed around a cable guide wheel 112 carried by the base 86 and is coupled to the linkage 88. A rider operates the gear shifter to move the linkage laterally to shift the chain C among the rear sprockets G1-G11, as is known in the art.

Figure 4:
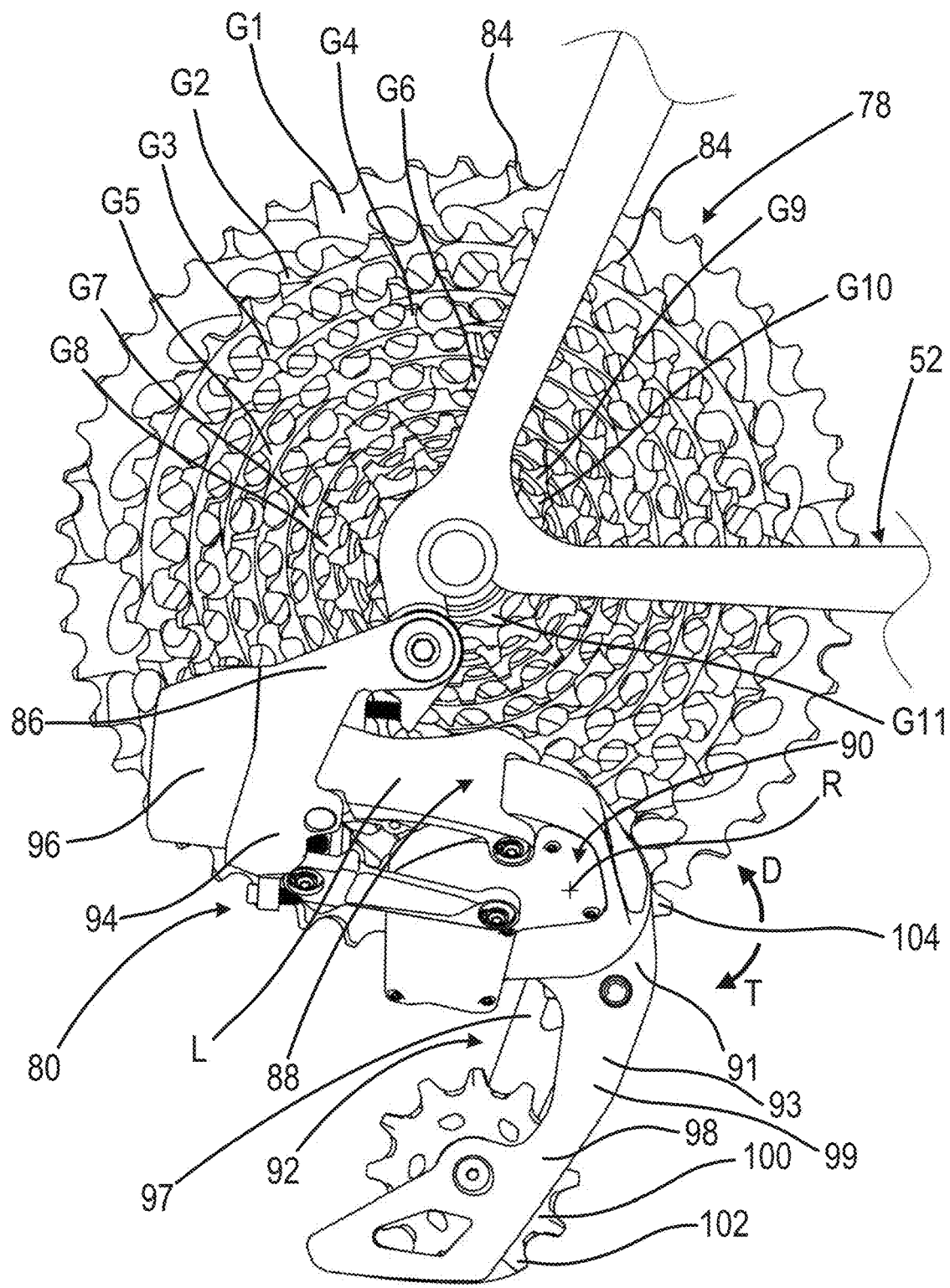
FIG. 4 is a close-up side view of one example of an electronic rear derailleur mounted to a bicycle, the electronic rear derailleur including a fluid damper in accordance with the teachings of the present disclosure.

Referring to FIG. 4, a manual or electric configuration of the rear derailleur 80 may be otherwise configured. The rear derailleur 80 is shown as one of an electric configuration. In the embodiment shown in FIG. 4 the guide wheel 104 is rotatable about the cage rotation axis R. In such a configuration, rotation about the cage rotation axis R will not change the relative position of the guide wheel 104 and the teeth 84 of the rear sprockets G1-G11. For instance, a change between front sprockets F1 and F2 resulting in rotational movement of the tensioner wheel 100 about the cage rotation axis R will not change the relative positions of the guide wheel 104 and the rear sprockets G1-G11. The portion of the chain C that the guide wheel 104 directs to the rear sprockets G1-G11 may thus be tunable to have the same position relative to one of the rear sprockets G1-G11 regardless of which of the front sprockets F1 or F2 the chain C engages.

The fluid damper 90, hereinafter identified as the "damper 90" to simplify the description, is now described referring first to FIGS. 6-8. Though discussed herein as a part of a rear derailleur of a bicycle, the fluid damper 90 may be incorporated onto a chain tensioner of a bicycle, where the chain tensioner is not a part of a front or rear derailleur. In accordance with the teachings of the present disclosure, the damper 90 generally has a housing 120 that defines a fluid cavity 122 therein. An access opening 124 in the housing provides access into the fluid cavity 122 (see FIG. 6). A rotational shaft or shaft 126 has a first axial end 128 received in the fluid cavity 122 and a second axial end 130, a portion of which is exposed to the outside of the housing 120 with the damper 90 assembled (see FIG. 7). The damper 90 also has a one-way valve or check valve 132 disposed within the fluid cavity 122 when the damper is assembled (see FIGS. 6 and 8). As discussed in more detail below, the check valve 132, and other check valve examples described herein, are movable between an open position and a closed position. The damper further has a ring-shaped bearing 134 positioned within the fluid cavity 122 in the assembled damper (see FIGS. 6 and 8). The damper 90 further has a closure or cap 136 that is configured to close off the access opening 124 into the cavity while still exposing a portion of the second axial end 130 of the shaft.

Figure 8:
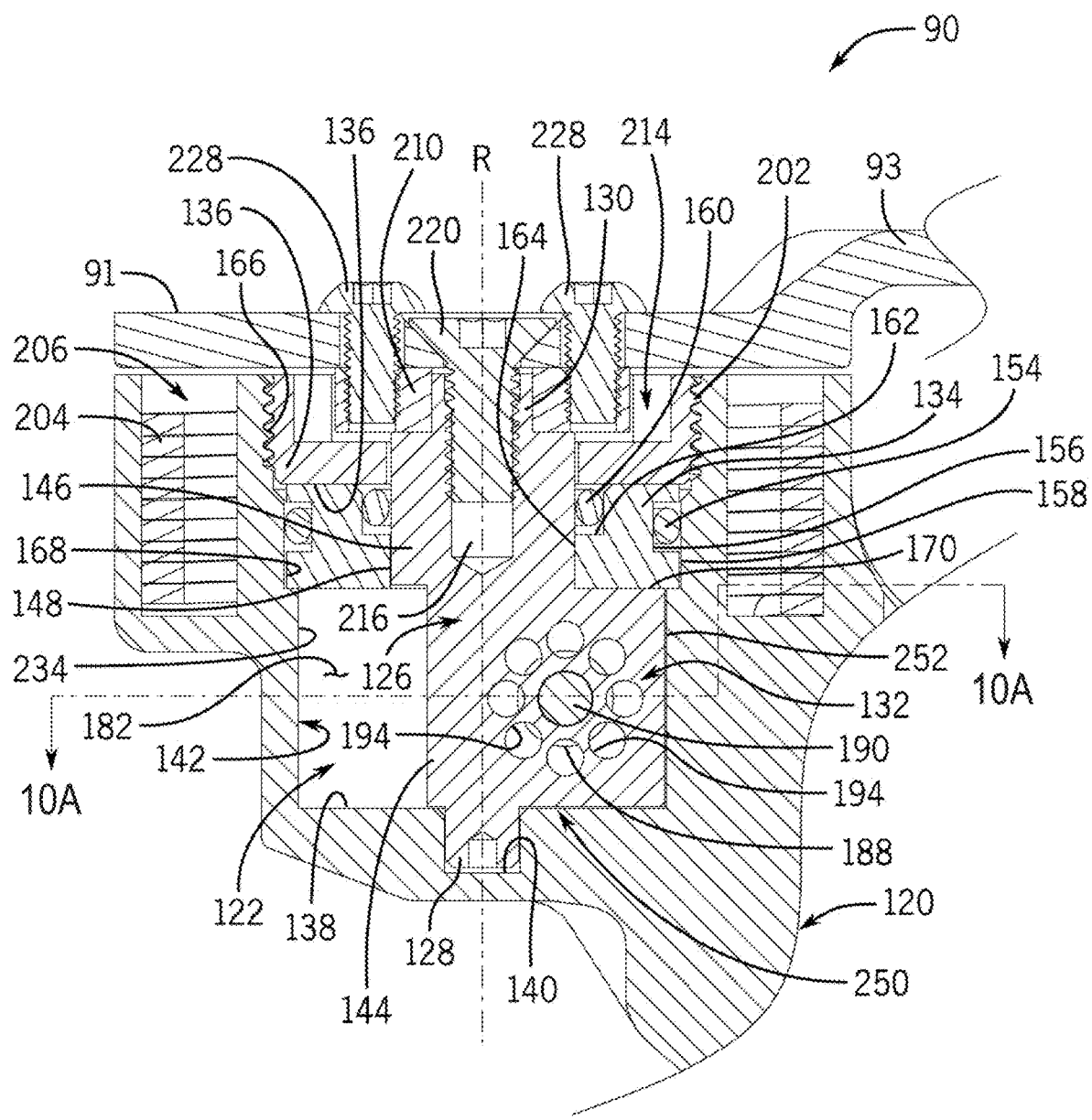
FIG. 8 is a cross-section view taken along line 8-8 and through the rotation axis of the manually actuated rear derailleur of FIG. 5.
Figure 9:
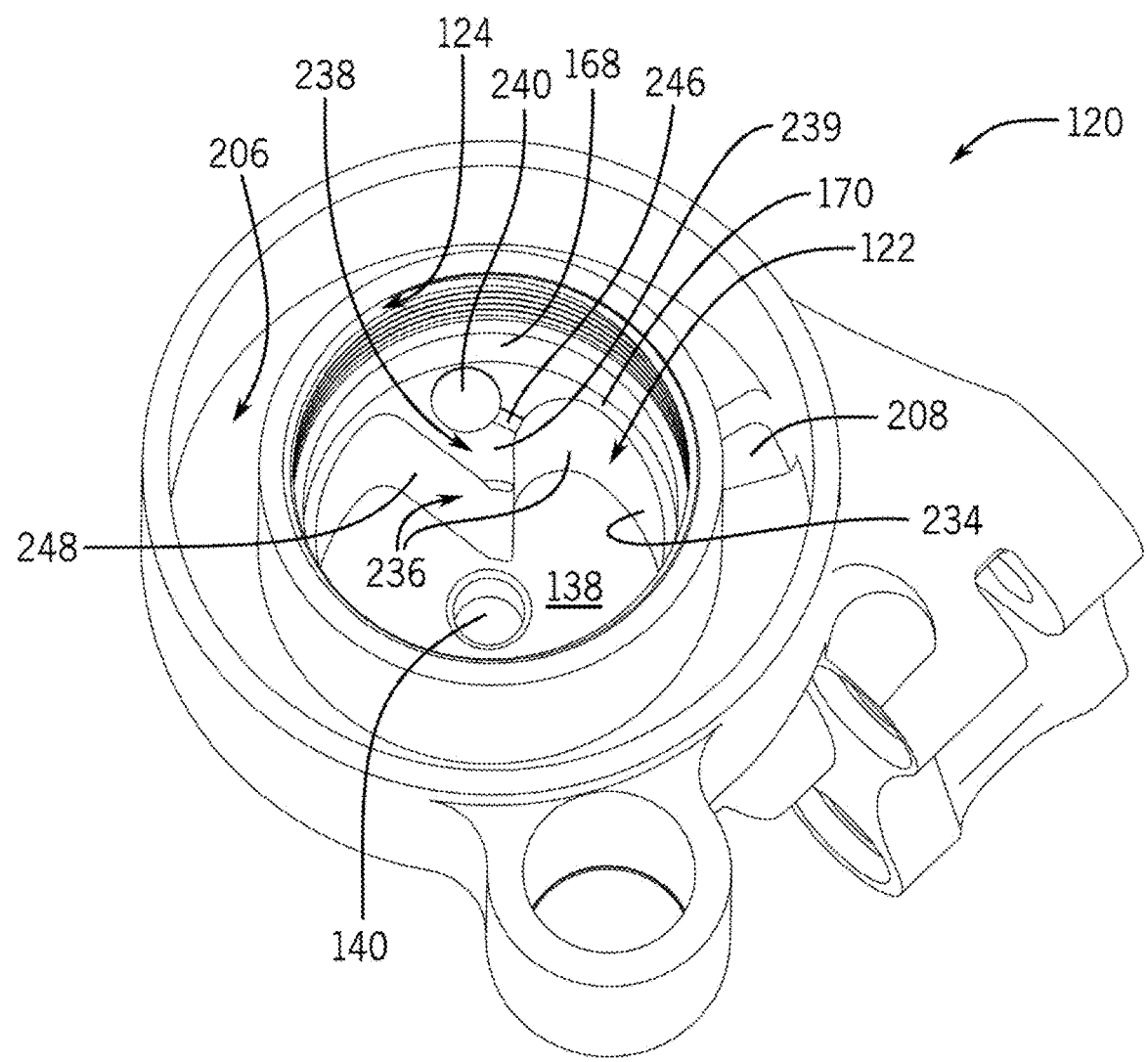
FIG. 9 is a perspective view of a housing of the fluid damper shown in FIG. 7 and depicting aspects of a compensation device of the fluid damper.

Referring to FIGS. 8 and 9, the fluid cavity 122 has a closed end wall 138 defined by the housing 120 and disposed opposite the access opening 124. A blind bore 140 is formed into the end wall 138 and is positioned to define the cage rotation axis R. The fluid cavity 122 also has a side wall 142 extending between the end wall 138 and the access opening 124. The side wall 142 surrounds and defines the boundaries of the fluid cavity 122 in combination with the end wall 138 and the cap 136, when assembled. Details of the fluid cavity 122 are described in further detail below.

Figure 6:
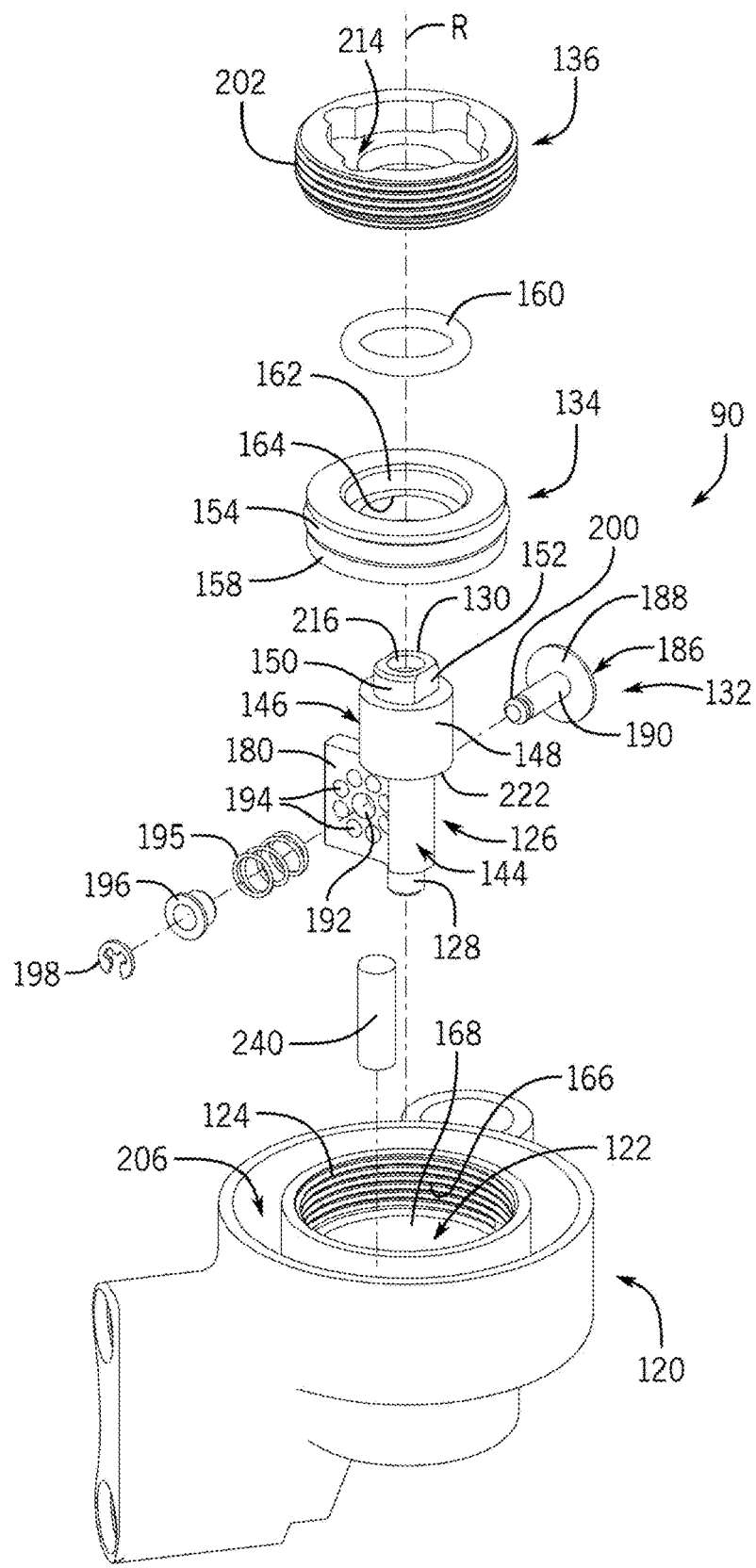
FIG. 6 is an exploded perspective view of the fluid damper of FIGS. 2-5.
Figure 7:
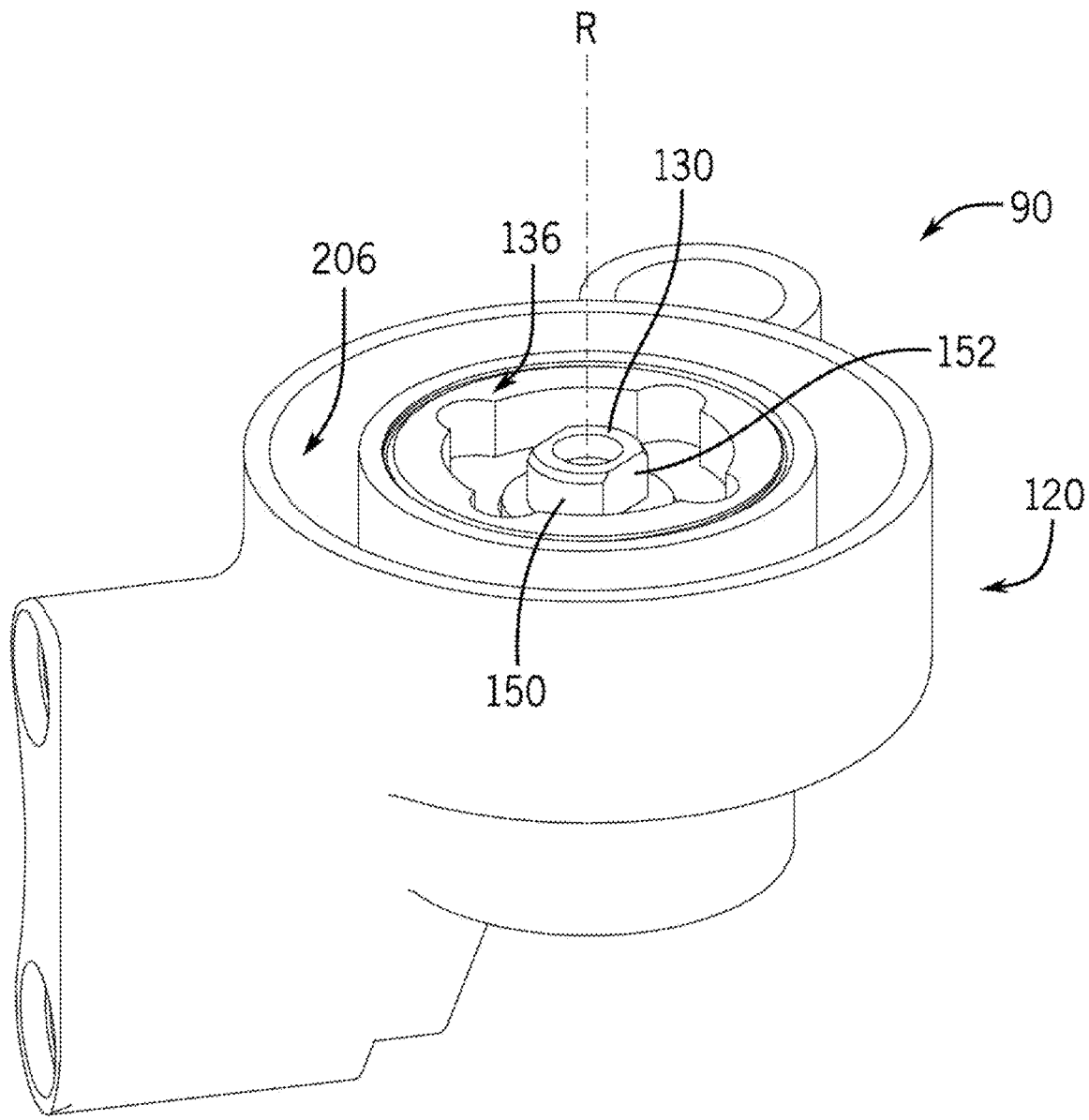
FIG. 7 is an assembled perspective view of the fluid damper of FIG. 6.

Referring to FIGS. 6 and 8, the shaft 126 has a main section 144 that is cylindrical and has a first diameter. The first axial end 128 is also cylindrical and protrudes from one end of the main section 144. The first axial end 128 has a second diameter that is smaller than the first diameter of the main section 144. The first axial end 128 of the shaft 126 is received in the blind bore 140 such that the shaft can rotate about the cage rotation axis R. The shaft 126 also has a bearing section 146 disposed at an end of the main section 144 opposite the first axial end 128. The bearing section 146 is also cylindrical and defines a circumferential bearing surface 148. The bearing section 146 has a third diameter that is larger than the first diameter of the main section 144 of the shaft 126. The second axial end 130 protrudes from the bearing section 146 of the shaft 126. The second axial end 130 has a double-D shape in cross section. The second axial end 130 thus has two curved portions 150 disposed opposite one another and two flat portions 152 opposite one another around the circumference of the second axial end.

Referring to FIGS. 6 and 8, the bearing 134 is circular and ring-shaped, as noted above. The bearing 134 has a static seal, such as an O-ring 154, that is seated in a groove 156 in an outer circumferential surface 158 of the bearing. The bearing 134 also has a dynamic seal, such as an O-ring 160, that is seated in a recess 162 in an inner circumferential surface 164 of the bearing. The inner circumferential surface 164 defines a hole through the bearing.

As shown in FIGS. 6 and 9, the side wall 142 of the fluid cavity 122 has several different segments. A first or outermost segment is circular and is disposed adjacent the outside of the housing 120. This outermost segment defines the access opening 124 into the fluid cavity. Female mechanical threads 166 are provided around the circumference of the access opening 124. A second or intermediate segment of the side wall 142 is disposed internally (relative to the fluid cavity 122) and directly adjacent the access opening 124. This intermediate segment is also circular and defines a sealing surface 168. The diameter of the sealing surface 168 is slightly smaller than the diameter of the threaded access opening 124, creating an outward facing (relative to the fluid cavity 122) step or shoulder, hereinafter a bearing stop 170. When assembled, the outer static O-ring 154 seats and seals against a portion of the side wall 142, i.e., the sealing surface 168 within the fluid cavity 122. An edge of the inner surface 172 of the bearing 134 is also borne against the bearing stop 170, as depicted in FIG. 8. Also, the shaft 126 is received through the central hole defined by the inner surface 164 of the bearing 134 when the damper 90 is assembled. As shown in FIG. 8, the bearing surface 148 on the bearing section 146 of the shaft 126 is rotatably received in the hole through the bearing. The dynamic O-ring 160 on the inner surface 164 of the bearing 134 seats and seals between the bearing surface 148 of the shaft 126.

Referring to FIGS. 6, 8, and 10, an isolator or divider feature is movably disposed within the fluid cavity to divide the cavity into two variable volume compartments on either side of the isolator or divider feature. The isolator or divider feature may move linearly, rotationally, or in some other manner, if desired. In this example, the isolator or divider feature is a vane 180 that projects radially outward from the main section 144 of the shaft 126. As the shaft 126 rotates, the vane 180 will move rotationally therewith, as described below. In this example, the vane 180 is a generally rectangular wall that is integrally formed as a part of the shaft 126. The vane 180 essentially divides the fluid cavity 122 within the housing 120 into a fluid return chamber 182 and a damping chamber 184. When the fluid damper 90 is assembled, the return chamber 182 and damping chamber 184 both are filled to contain a fluid, such as a hydraulic liquid, as described in greater detail below. The fluid in one example may be a viscous damping fluid, such as a silicone oil. The fluid may have a viscosity of between about 1,000 and about 100,000 centistokes.

Figure 28:
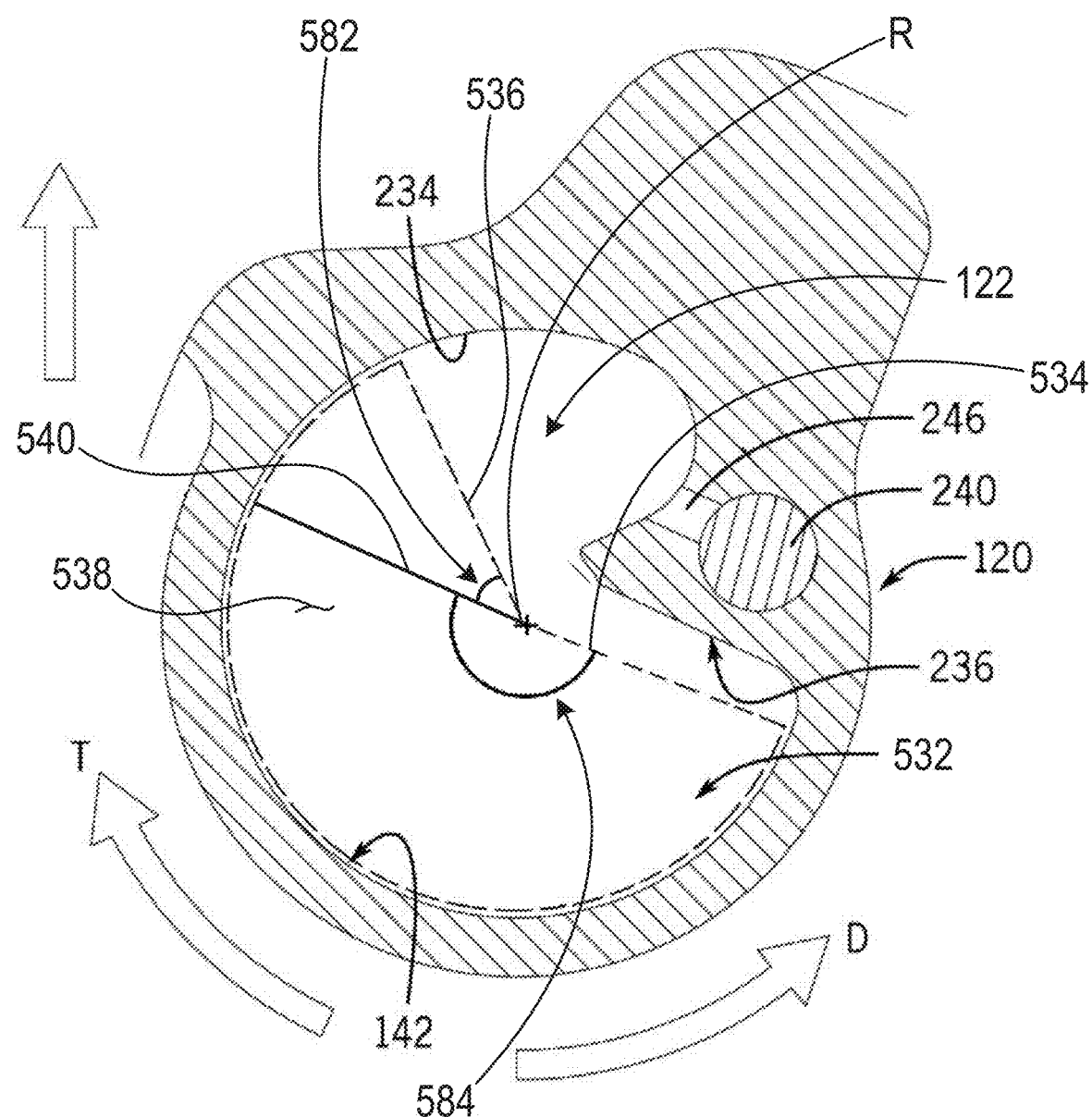
FIGS. 28 and 29A are cross-sections, like the cross-section of FIG. 10A, but depicting a representation of a vane boundary, the movement of which defines a vane sweep region.

Referring to FIG. 28, movement of the vane 180, represented as a vane boundary 540, defines a vane sweep region 532. The vane sweep region 532 is a space through which the vane rotates. For example, the movement of the vane 180 and associated vane boundary 540 has a first position 534 to divide the fluid cavity 122 to have a minimally-sized damping chamber 184 and a second position 536 to divide the fluid cavity 122 to have a maximally-sized damping chamber 184. Movement between the first and second positions 534, 536 defines the vane sweep region 532.

The relative sizes of the damping chamber 184 and the return chamber 182 may be defined as proportional to a damping angle 584 and a return angle 582. The damping angle 584 is defined as an angle between the vane boundary 540 and the second extreme position 536. The return angle 582 is defined as an angle between the vane boundary 540 and the first extreme position 534. The size of the damping chamber 182 may thus be directly proportional to a magnitude of the damping angle 582 and the size of the return chamber 184 may thus be directly proportional to a magnitude of the return angle 582.

As the vane boundary 540 moves from the first extreme position 534 to the second extreme position 536 in the chain tensioning direction T, the damping angle 584 and the damping chamber 184 increase in magnitude and size while the return angle 582 and the return chamber 182 decrease in magnitude and size. As the vane boundary 540 moves from the second extreme position 536 to the first extreme position in the damping direction D, the return angle 582 and the return chamber 182 increase in magnitude and size while the damping angle 584 and the damping chamber 184 decrease in magnitude and size.

Figure 29A:
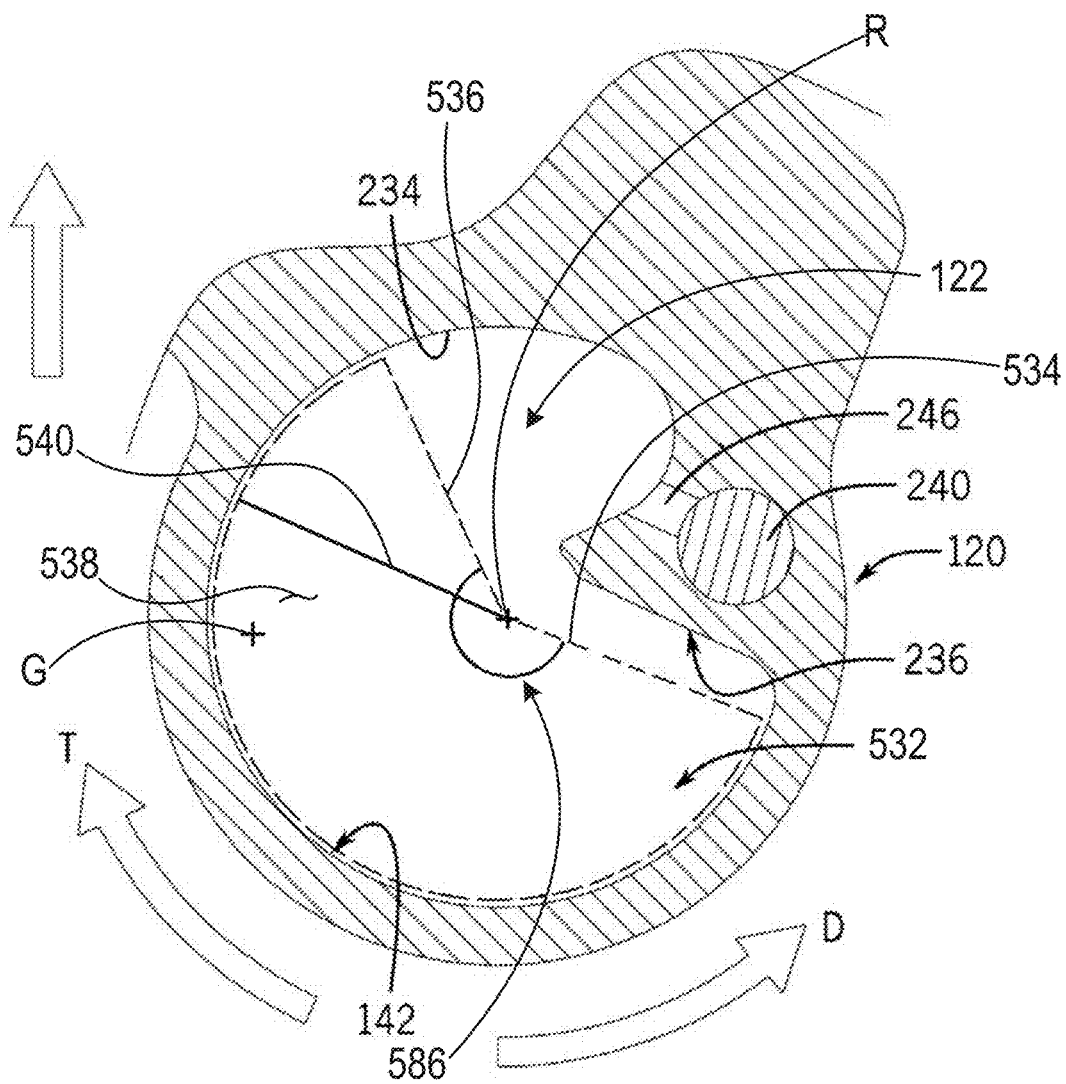
Figure 29B:
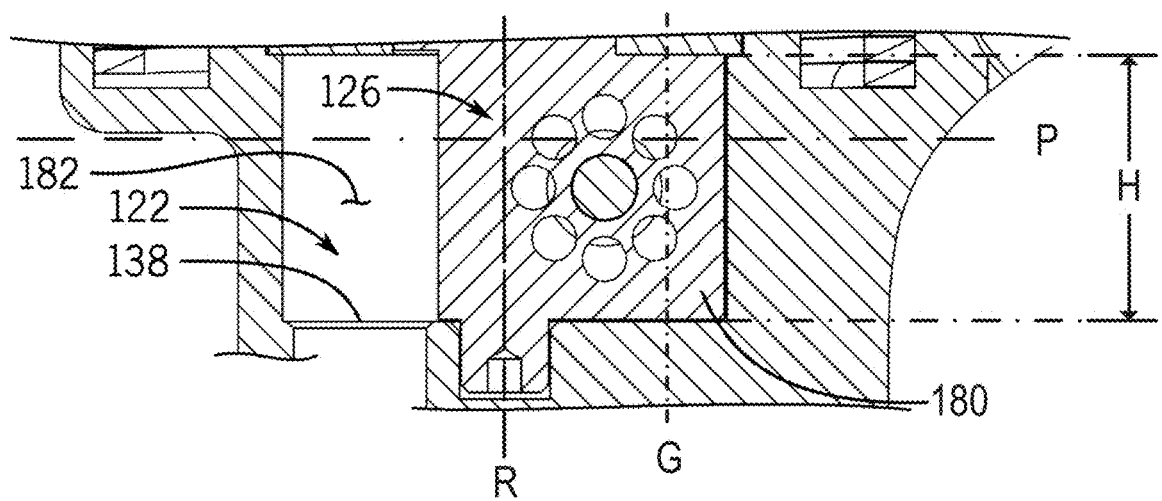
FIG. 29B is a cross-section view, which is like FIG. 8, of the embodiment of the fluid damper as illustrated in FIG. 29A.

Referring now to FIGS. 29A and 29B, regardless of the position of the vane boundary 540, a combination of the damping angle 584 and the return angle 582 will yields the vane sweep angle. The addition of the damping angle 584 and the return angle 582 may yield the vane sweep angle 586. The vane sweep angle 586 also may be defined as an angle defining the range of motion of the vane boundary 540 between the first extreme position 534 and the second extreme position 536. The range of motion of the vane boundary 540 is shown in a plane P of FIG. 29B bisecting the vane 180 perpendicular to the rotation axis R. The vane sweep region 532 in the plane P may be described as a vane sweep area 538.

As shown in FIG. 29B, the vane 180, and associated vane boundary 540 as illustrated in FIG. 28B, extends axially beyond the plane P in at least one direction. Thus the vane sweep region 532 is a three dimensional region having a volume. In the illustrated embodiment, the vane sweep region 532 is defined as a cylindrical sector with an area of the vane sweep area 538 and a height of a vane height H correlating to the length of the vane along the rotation axis R. The rotation axis R will be the axis of the cylindrical sector defining the vane sweep region 532. In such a way, the rotation axis R will intersect the vane sweep region 532 and the vane sweep area 538. In another embodiment, the vane sweep region may not be a cylindrical region as formed by a rectangular vane. In such an embodiment, for example an embodiment including a triangular or other shaped vane, a vane sweep area may be defined as the largest area of the vane sweep region contained in a plane perpendicular to the rotation axis.

Figure 10A:
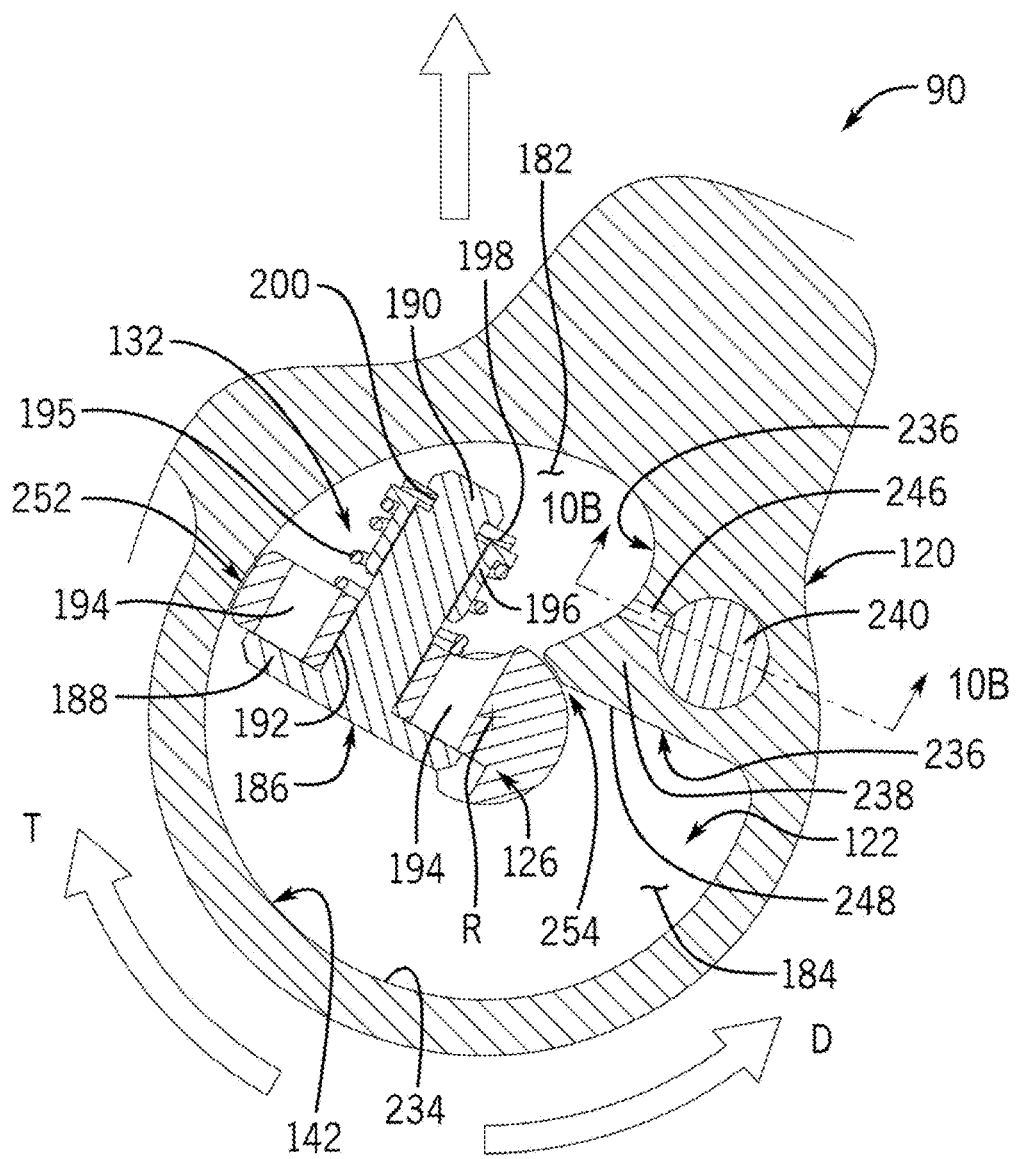
FIG. 10A is a cross-section view taken along line 10A-10A of the fluid damper of FIG. 8 and depicting portions of the fluid damper and a check valve in one position during use.

Referring again to FIGS. 6, 8, and 10, the check valve 132 in this example has a valve body or poppet 186 including a head 188 disposed at one end of a valve stem 190. The valve stem 190 is slidably received in a stem hole 192 in the vane 180. The head 188 is sized and shaped to selectively block a first, free, main, or primary flow path within the fluid cavity 122. In this example, a series of flow holes 194 that pass through the vane 180 define the first flow path. In this example, the flow holes 194 are spaced apart from one another around the stem hole 192. The head 188 is thus a circular shape so that the head may selectively cover and block each of the flow holes 194. A valve spring 195 is received over the valve stem 190 on the opposite side of the vane 180 from the head 188. Likewise, a spring support member or spring stop 196 may also be slidably received on the valve stem 190, after the valve spring 195 is installed on the same side of the vane 180. A spring retainer, such as a snap ring 198, is attached to the valve stem 190 to retain the valve spring 195 and the spring stop 196 on the stem. In this example, the snap ring 198 has a C shape and is snapped onto the free end of the valve stem 190 and seats in a groove 200 thereon. The valve spring 195 is thus captured between the vane 180 and the snap ring 198 and/or the spring stop 196 to retain the valve spring on the poppet 186. The valve spring 195 is configured and arranged to bias the poppet 186 toward a closed position, as depicted in FIG. 10A. In the closed position, the head 188 is biased against the vane 180 by the bias force of the valve spring 195 to close of the first flow path, i.e., each of the flow holes 194 in this example. In the open position, as noted above and as described further below, the head 188 is forced by fluid pressure away from the vane 180 against the bias force of the valve spring 195 to open the first flow path, i.e., each of the flow holes 194.

Referring to FIGS. 6-9, the cap 136 in this example is disc shaped and has an outer circumferential surface with male mechanical threads 202. The male threads 202 of the cap 136 are configured to threadably engage the female threads 166 within the access opening 124 to the fluid cavity 122. When installed, the cap 136 closes off the access opening 124 on the housing 120. The installed cap 136 also firmly clamps the bearing 134 against the bearing stop 170, as shown in FIG. 8.

Figure 12:
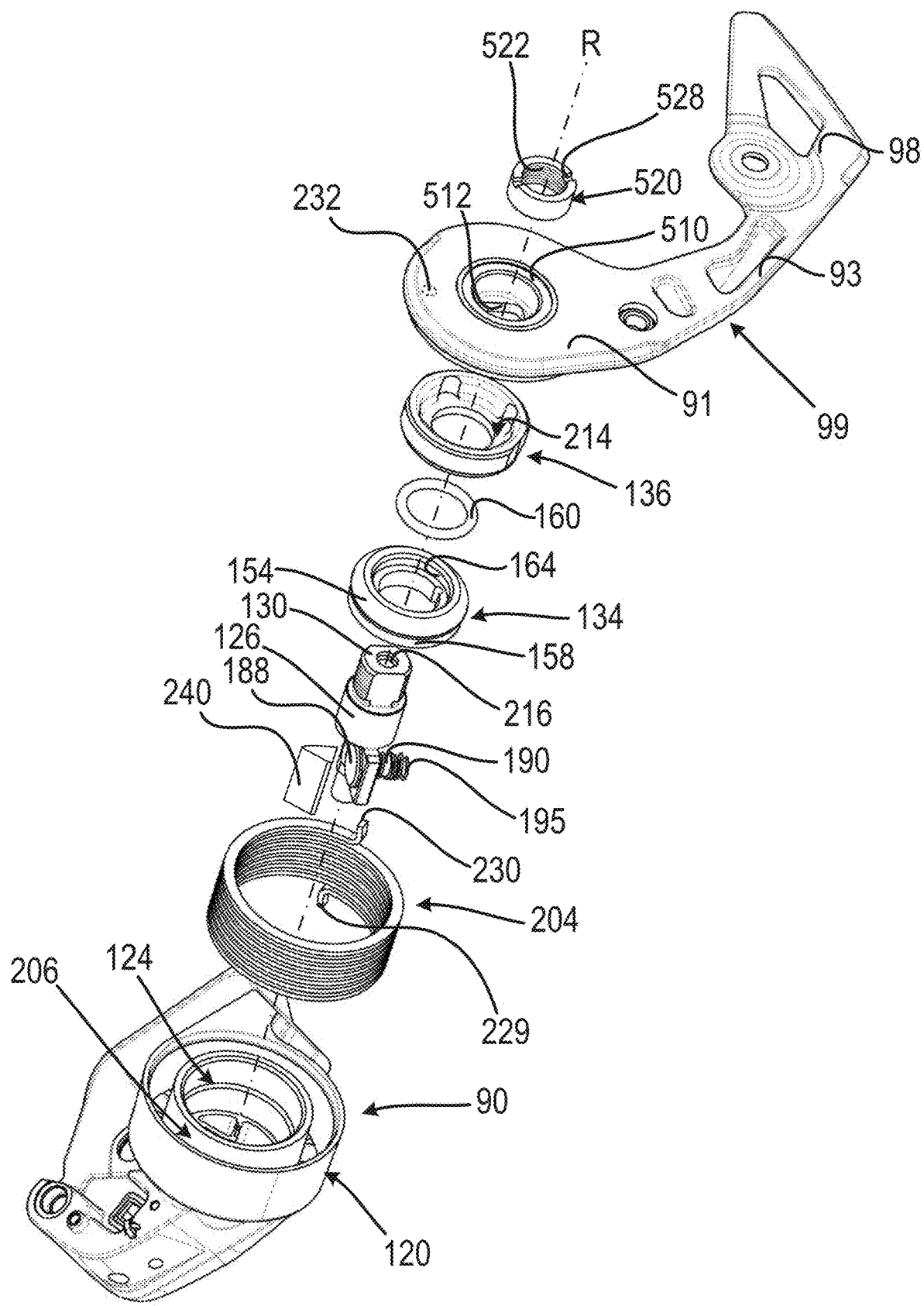
FIG. 12 is a perspective view of portions of the rear derailleur of FIG. 4.

Referring to FIG. 12, the cap 136 may be otherwise configured to engage with the access opening 124. For example, the cap 136 may be press fit into the access opening 124. The cap 136 may also be adhesively attached or bonded to the access opening 124.

Referring to FIGS. 8, 11, 12 and 13, the rear derailleur 80 includes a tensioning spring 204 for tensioning the chain C of the drivetrain 58. The tensioning spring 204 in this example is a torsion spring that is received in an annular recess or channel 206 on the housing 120. In this example, the annular channel 206 is formed in the material of the housing 120 and surrounds the fluid cavity 122. The tensioning spring 204 has a first prong or leg 229 that protrudes angularly from one end of the spring and toward a bottom surface of the annular channel 206. The first prong or leg 229 engages a hole 208 (see FIG. 9) in the bottom surface of the annular channel 206. The first prong 229 and hole 208 retain the one end of the tensioning spring 204 in a fixed position within the annular channel 206 and relative to the housing 120. The tensioner spring 204 is disposed radially outward of the fluid damper 90 on the housing 120.

Figure 11:
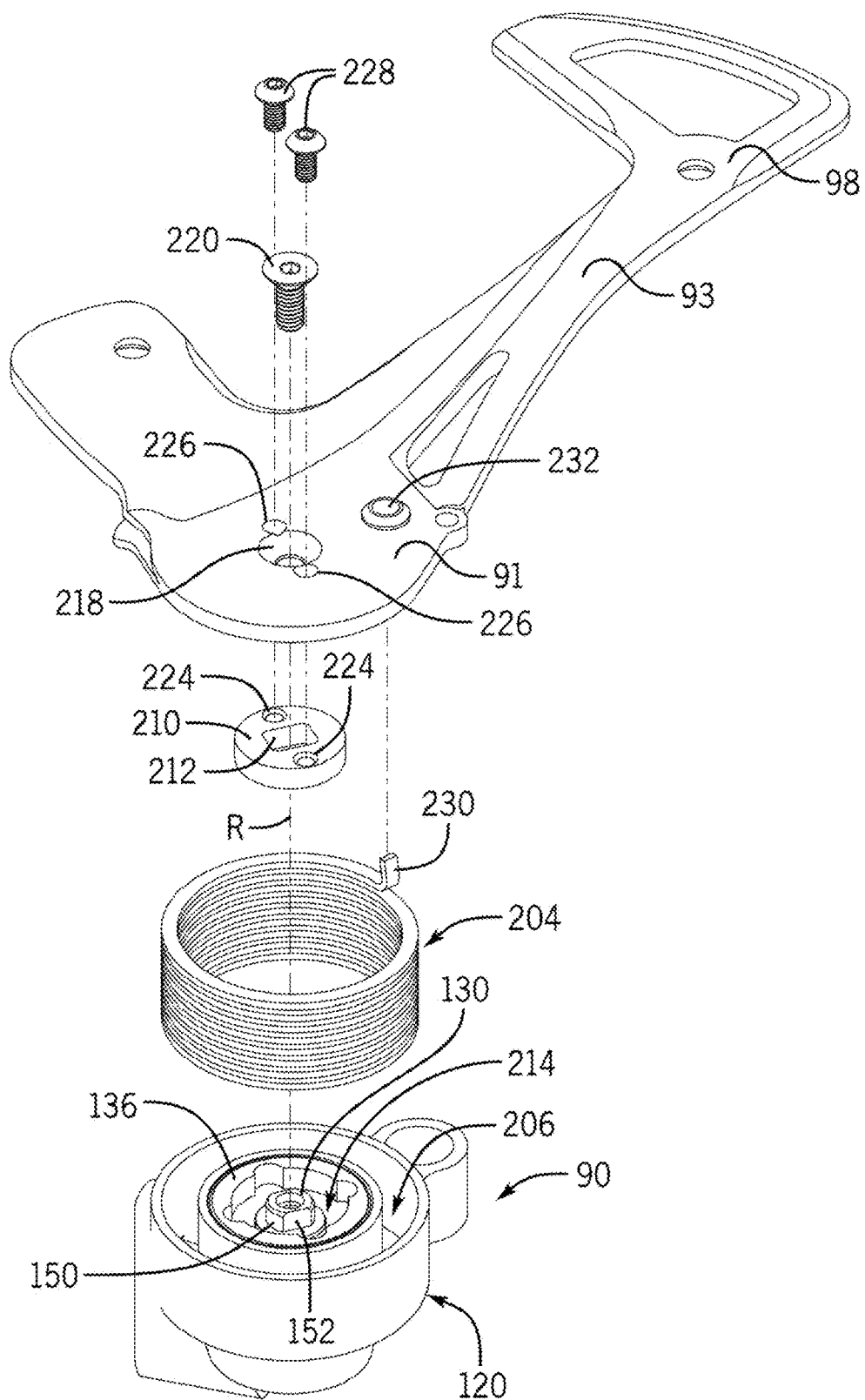
FIG. 11 is a perspective view of the assembled fluid damper of FIG. 7 and in an exploded view of portions of the rear derailleur of FIGS. 3 and 5.

Referring to FIGS. 8 and 11 and as noted above, the proximal end 91 of the cage 93 is coupled to the damper 90. In this example, a disc-shaped torque carrier 210 has a double-D shaped central hole 212. The torque carrier 210 resides in a recess 214 in the exterior side of the cap 136 and the hole 212 is received over and engages with the correspondingly double-D shaped second axial end 130 of the shaft 126. Thus, the torque carrier 210 and the shaft 126 are rotationally fixed to each other. A female threaded bore 216 is formed into the second axial end 130 of the shaft. A chamfered hole 218 is formed through the proximal end 91 of the cage 93 and aligns with both the central hole 212 in the torque carrier 210 and the blind threaded bore. A male threaded bolt 220 is passed through the chamfered hole 218 and the central hole 212 and screws into the threaded bore 216. The bolt 220 clamps and attaches the cage 93 to the damper 90 with the torque carrier 210 sandwiched between the cage 93 and a shoulder 222 that is formed on the free end of the bearing section 146 of the shaft 126 facing the second axial end 130.

The torque carrier 210 has two threaded fastener blind holes 224 disposed on opposite sides of the central hole 212. Likewise, the cage 93 has two through holes 226 disposed on opposite sides of the chamfered hole 218. The through holes 226 are aligned with the blind holes 224 to properly orient the cage 93 relative to the damper 90. Two screws 228 are used to further secure and fix the torque carrier 210 and the cage 93 to one another. This structure results in the cage 93, the torque carrier 210, and the shaft 126 all being fixed to one another to rotate as a unit or in concert with one another about the rotation axis R.

Alternatively, as in FIG. 12, the torque carrier 210 may be omitted. For instance, a torque member 512 may be attached to or integrally formed with the cage 93. For instance, the torque member 512 may be comolded or overmolded with the first guide member 99 of the cage 93. The torque member 512 may include an insert hole 512 with which the shaft 126 may interact. For instance, the torque member 512 may be received by and engage with the correspondingly double-D shaped second axial end 130 of the shaft 126. Thus, the torque member 510 and the shaft 126 may be rotationally fixed to each other.

The torque member 512 may be secured to the shaft 126 with the use of an outer guide fixing member 520. For instance, the outer guide fixing member 520 may have outer guide fixing member threads 522, such as female outer guide fixing member threads 522 in FIG. 12. The threads 522 may be configured to engage with male threads of the second axial end 130 of the shaft 126. The outer guide fixing member 520 may thus rotationally secure the cage 93 to the shaft 126 and axially secure the cap 136 to the access opening 124, for example in the case of a press fit interface. Alternatively, threaded engagement of the cap 136 and the access opening 124 may close off the fluid cavity 122. The outer guide fixing member 520 may secure the tensioner spring 204 between the first guide member 99 of the cage 93 and the housing 120 within the annular channel 206.

The outer guide fixing member 520 may include a fixing feature 528. For instance, the fixing feature 528 may be one or more notches with which an installation tool may engage. Because a fluid damper 90 may be designed to not require internal service or repair, the fixing feature 528 may be designed to facilitate installation but not removal. For instance, the fixing feature 528 may be a pair of notches each having an orthogonal configuration to facilitate torque transfer from an installation tool and an opposing obtuse configuration so that reverse rotation of the installation tool forces the installation tool axially out of engagement.

Figure 13:
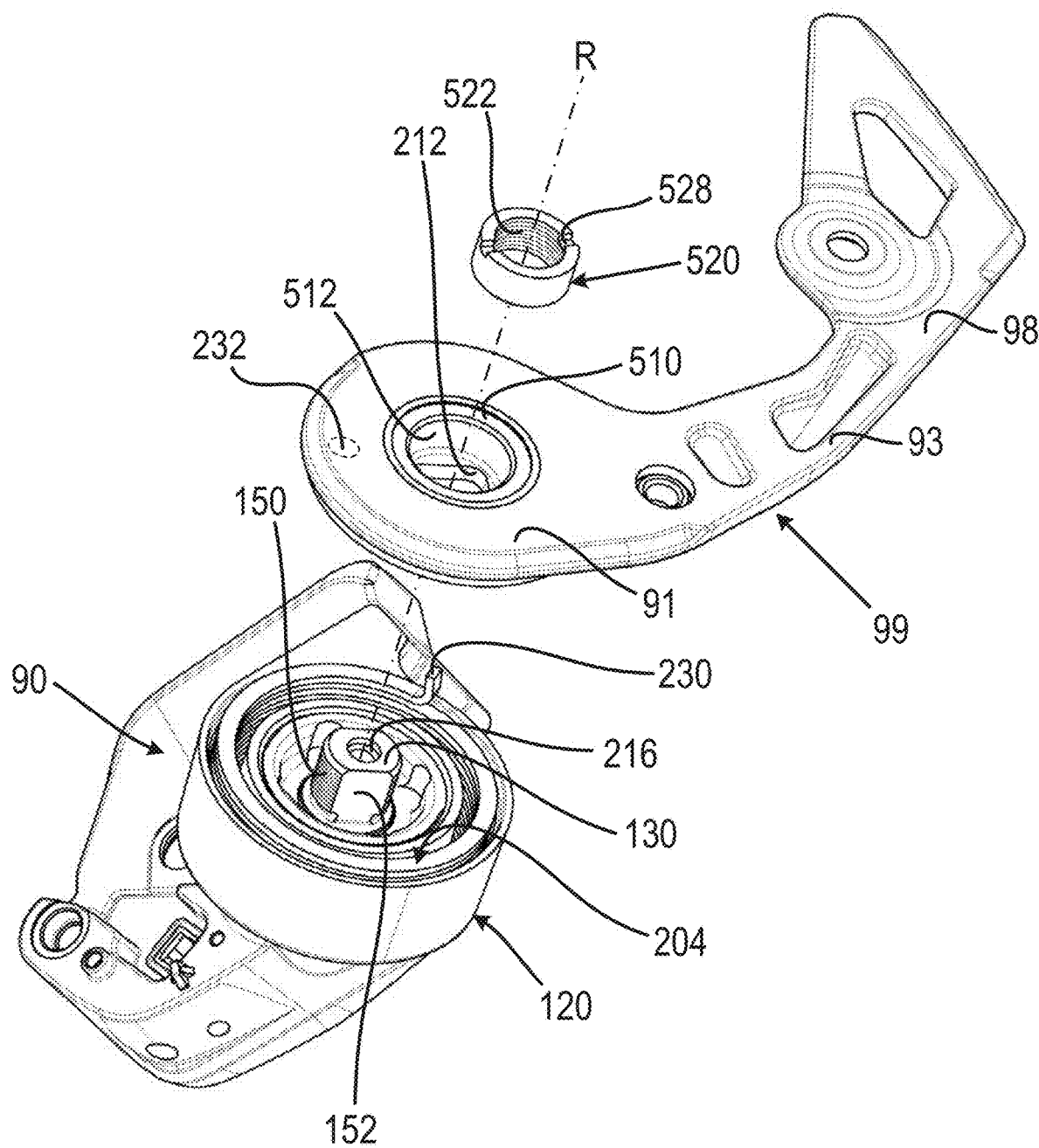
FIG. 13 is a perspective view of the assembled fluid damper of FIG. 12 and an exploded view of portions of the rear derailleur of FIG. 4.
Figure 14:
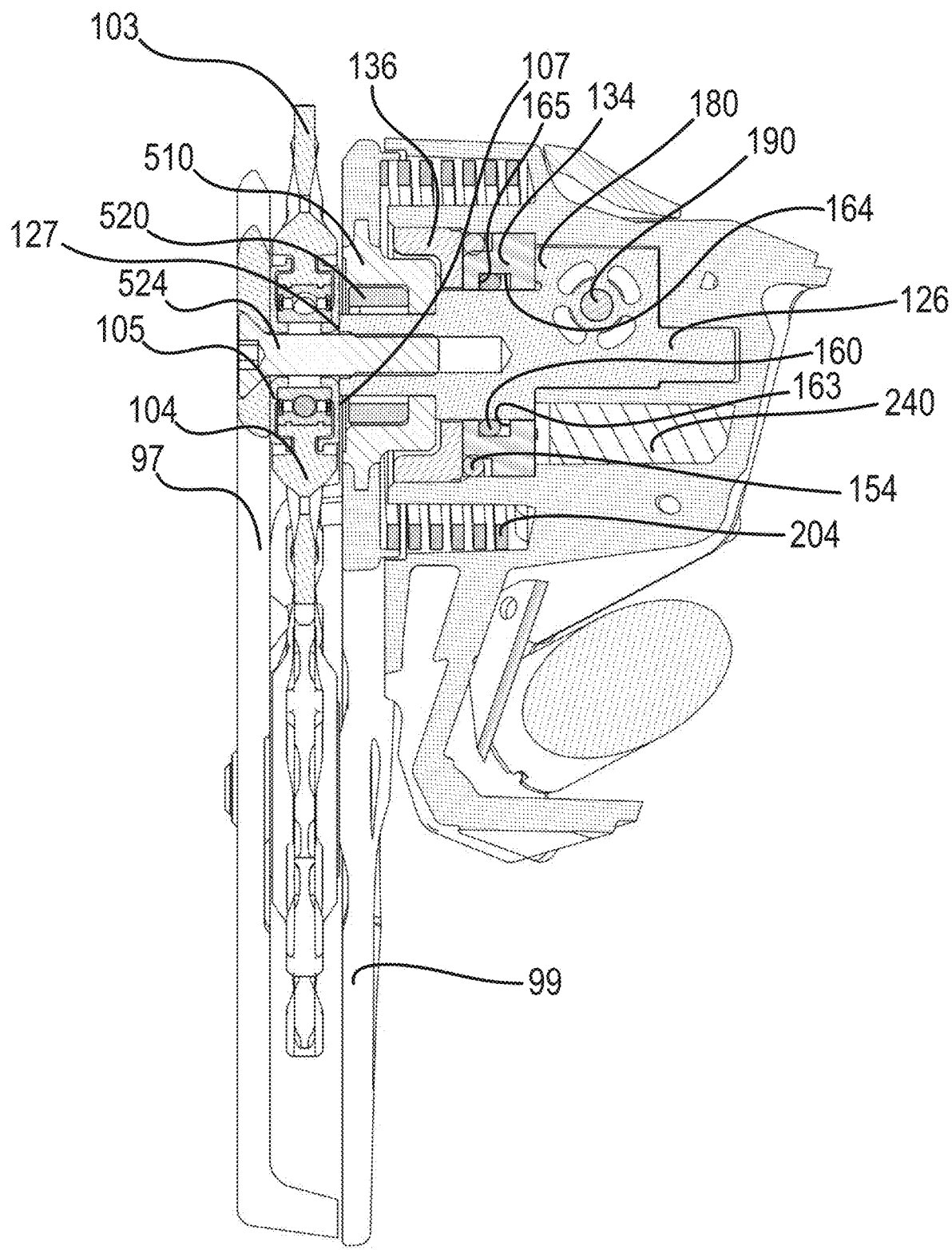
FIG. 14 is a bisected cross-sectional view of the assembled rear derailleur of FIG. 4.

FIGS. 12-14 show an embodiment in which the guide wheel 104 rotates about a guide wheel axis G that intersects the fluid chamber within the vane sweep region 532 of the vane 180. More specifically, the embodiment of FIGS. 12-14 has an inner guide fixing member 524 fixing the guide wheel through interaction with the shaft 126. The inner guide fixing member 524 may be a male threaded bolt for engagement with the female threaded bore 216 of the shaft 126. As shown in FIG. 14, the inner guide fixing member 524 may fix the guide wheel 104 between the second guide member 97 and the first guide member 99. The inner guide fixing member 524 may have threaded engagement with the threaded bore 216 about the cage rotation axis R. Additionally, the guide wheel 104 may rotate about the cage rotation axis R with this attachment.

The guide wheel 104 may include a central portion 105. The central portion 105 of the guide wheel 104 may be configured to interact with at least one of the first and second guide members 99, 97. For instance, the guide wheel 104 may be used to fix the second guide member 97 relative to the first guide member 99 through fixing of the central portion 105 between the first guide member 99 and the second guide member 97. The central portion 105 may be rotationally fixed to one or both of the guide members 99, 97. Other components of the guide wheel 104 may be rotationally attached to the central portion 105. For instance, the guide wheel 104 may have an outer portion 103 rotatable about the central portion 105.

The guide wheel 104 may have a guide wheel face 107. The guide wheel face 107 may be located on the central portion 105. The guide wheel face 107 may be configured to locate the guide wheel 104 and associated components to other components of the rear derailleur 80. For instance, the guide wheel face 107 may abut a shaft face 127 on the second axial end 130 of the shaft 126 in order to locate the guide wheel 104 and the second guide member 97. In such a way, the central portion 105 of the guide wheel 104 may be configured to transmit torque between the shaft 126 and the cage 93.

The guide wheel axis G may be the same as the rotational axis R as shown, for example, in FIG. 14. Alternatively, the guide wheel axis G may be distinct from the rotational axis R, for example as illustrated in FIGS. 29A and 29B. Certain objectives may be achieved by locating the guide wheel axis G at a specific radial distance relative to the rotational axis R. For instance, locating the guide wheel axis G relatively close to the rotational axis R may be used to limit changes in position of the rear derailleur 80 responsive to position of the chain C as determined by the front gear changer 85. In such a configuration, rotation about the cage rotation axis R will change the relative position of the guide wheel 104 and the teeth 84 of the rear sprockets G1-G11 relatively little as compared with a configuration having a guide wheel axis G at a longer distance from the rotational axis R.

The tensioning spring 204 also has a second prong or leg 230 that protrudes angularly from the other end of the spring. The second prong 230 is received in or engages a receiving hole 232 in the cage 93. This fixes the second prong 230, and thus the other end of the tensioning spring 204, to the cage 93. During assembly, the tensioning spring 204 is preloaded to a predetermined torque value. The spring 204 thus acts to bias the cage 93 in the chain tensioning direction T, as depicted in FIGS. 5 and 10.

Referring to FIGS. 6, 9, and 10, in this example, the side wall 142 has a third or innermost segment within the fluid cavity 122 and adjacent the end wall 138. The innermost segment includes a circular portion 234 that is concentric with and spaced a distance radially from the cage rotation axis R. The innermost segment of the side wall 142 also has a non-circular portion 236 that is curved toward and spaced closer to the cage rotation axis R. The non-circular portion 236 of the side wall 142 thus creates a shelf 238 within the fluid cavity 122. The shelf 238 protrudes radially inward toward the cage rotation axis R in comparison to the circular portion 234. The shelf 238 also protrudes relative to the end wall 138 with the cavity toward the access opening. When the damper 90 is assembled, the bearing 134 lies in contact with a surface 239 of the shelf 238.

In this example, a compensation device is provided in fluid communication with the fluid cavity 122, either directly or more indirectly through various fluid flow paths. The compensation device is disposed within the return chamber 182 of the cavity 122 in this example for purposes described in further detail below. In general, the compensation device allows for some volume expansion, either directly or indirectly, of the return chamber 182 during use.

Further, any of the disclosed compensation devices, as described below, can compensate for a change in fluid volume caused by a fluid temperature change, a fluid leak from the fluid cavity, or both, and perhaps more so if the compensation device is pressurized upon assembly, also as described below. Alternate examples of compensation devices are disclosed and described herein.

Figure 10B:
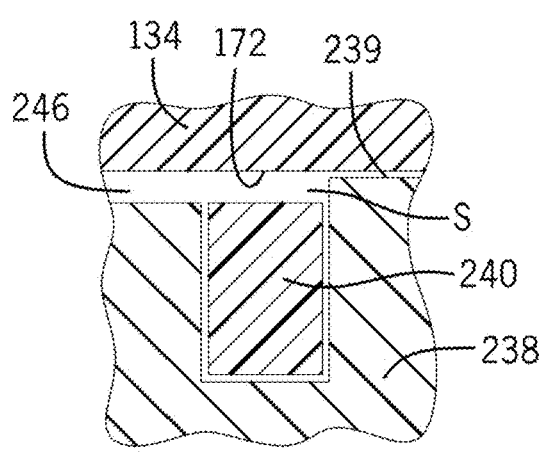
FIG. 10B is a cross-section view taken along line 10B-10B of a compensation device of the fluid damper of FIG. 10A and in a normal state.

Referring again to FIGS. 6, 9, and 10A, the compensation device in this example includes a movable body in the form of a resilient body 240 that is positioned within a blind auxiliary bore 242 formed into the surface 239 of the shelf 238. In one example, the resilient body 240 is formed of a closed-cell foam and is loosely received in the blind bore 242 in the shelf 238. The shape of the resilient body 240 may mirror the shape of the auxiliary bore 242. In this example, the resilient body 240 is a cylinder and the auxiliary bore 242 has a cylindrical shape. As shown in FIG. 10B, the height of the resilient body 240 may be slightly less than a depth or height of the auxiliary bore 242 so that a small, variable volume space or variable volume expansion chamber S may be left above and between the end of the resilient body and the inner surface 172 (i.e., the surface facing the cavity 122) of the bearing 134. Further, a shallow flow channel 246 is formed along the surface 239 of the shelf 238 and facing the inner surface 172 of the bearing 134. The flow channel 246 extends between the auxiliary bore 242 and the return chamber 182. The flow channel 246 allows fluid to flow between the return chamber 182 and the auxiliary bore 242 and thus exposes the end of the resilient body 240 within the variable volume expansion chamber S to fluid from the return chamber 182.

Referring to FIGS. 6, 8, and 10A, the shape of the damping chamber 184 within the fluid cavity 122 is a segment of an annular ring. The damping chamber 184 has i) a flat "bottom" defined by the end wall 138, ii) a flat "top" defined by the inner surface 172 of the bearing 134, iii) a concave outer boundary defined by the circular portion 234 of the side wall 142, and iv) a convex inner boundary defined by the cylindrical main section 144 of the shaft 126. One boundary of the circumferential boundaries of the damping chamber 184 is movable and is defined by the position of the vane 180. Referring to FIG. 10A, as described in more detail below, the vane 180 moves circumferentially relative to the cage rotation axis R. The other boundary of the circumferential boundaries of the damping chamber 184 is fixed and is defined by a face 248 of the shelf 238. The face 248 is a part of the non-circular portion 236 of the side wall 142, as best illustrated in FIGS. 9 and 10A. Still referring to FIG. 10A, the damping chamber 184 has a generally rectangular cross-section shape between the shaft 126 and the side wall 142. Thus, the vane 180 also has the same cross-section shape.

Referring to FIGS. 3, 5, and 10A, during use and operation of the bicycle 50 and the rear derailleur 80, the shaft 126, which is rotationally fixed to the cage 93, can only rotate in the damping direction D by forcing fluid in the damping chamber 184 into the return chamber 182. This is because the vane 180 will attempt to move in the damping direction D about the cage rotation axis R, which results in the vane 180 attempting to reduce the volume of the damping chamber 184. In this example, the incompressible nature of the hydraulic fluid within the damping chamber 184 will prevent this from occurring. Further, the check valve 132 will remain closed and thus prevent fluid from flowing via the first flow path, i.e., the flow holes 194 from the damping chamber 184 to the return chamber 182.

Thus, for fluid to flow from the damping chamber 184 to the return chamber 182 to permit rotation of the shaft 126 and cage 93 in the damping direction D, one or more second, secondary, or auxiliary flow paths must be provided. In this example, as depicted in FIGS. 8 and 10, a plurality of second flow paths is defined by relatively small or limited clearance gaps between parts within the fluid cavity 122. For example, one clearance gap or second flow path 250 may be provided or defined between an axial edge of the vane 180 and the end wall 138 of the cavity (see FIG. 7). Another clearance gap or second flow path 252 may be provided or defined between a radially distant edge of the vane end 180 and the circular portion 234 of the side wall 142 of the fluid cavity 122 (see FIGS. 8 and 10A). Yet another clearance gap or second flow path 254 may be provided or defined between the main section 144 of the shaft 126 and the end of the shelf 238 adjacent the shaft (see FIG. 10A). Though not shown herein as a second flow path, another limited clearance gap may be provided or defined between the opposite axial surface of the vane 180 and the inner surface 172 of the bearing 134. Any one or more of these or other clearance gaps may be used to create a desired second flow path for fluid from the damping chamber 184 to the return chamber 182. These second flow paths or gaps can be provided between portions of the rotatable shaft 126 and the housing 120 defining the fluid cavity 122.

Due in large part to the viscous nature of the fluid held in the damping chamber 184, the process of forcing fluid to bypass the shaft 126 via the one or more second flow paths 250-254 will dissipate a considerable amount of energy. The damping force will also be determined in part by the number and overall size of the one or more second flow paths, the size of the damping chamber 184, and the like. In any case, a damping force is exerted through the vane 180 on the shaft 126 and thus the cage 93, which is coupled to the shaft. The fluid damping force applied to the shaft 126 and thus the cage 93 is proportional to the rotational velocity of the shaft. Thus, slow cage rotational speeds (for example, when shifting gears) will provide little resistance to cage rotation in the damping direction D. In contrast, fast cage rotational speeds (for example, during an impact situation when riding over rough terrain), will provide high or significant resistance to cage rotation in the damping direction D. In the case of an electric derailleur (see FIG. 2), the low damping force when shifting will extend battery life. In the case of a cable actuated derailleur (see FIGS. 3 and 5), the low damping force when shifting will result in reduced shift effort to the rider.

Figure 15:
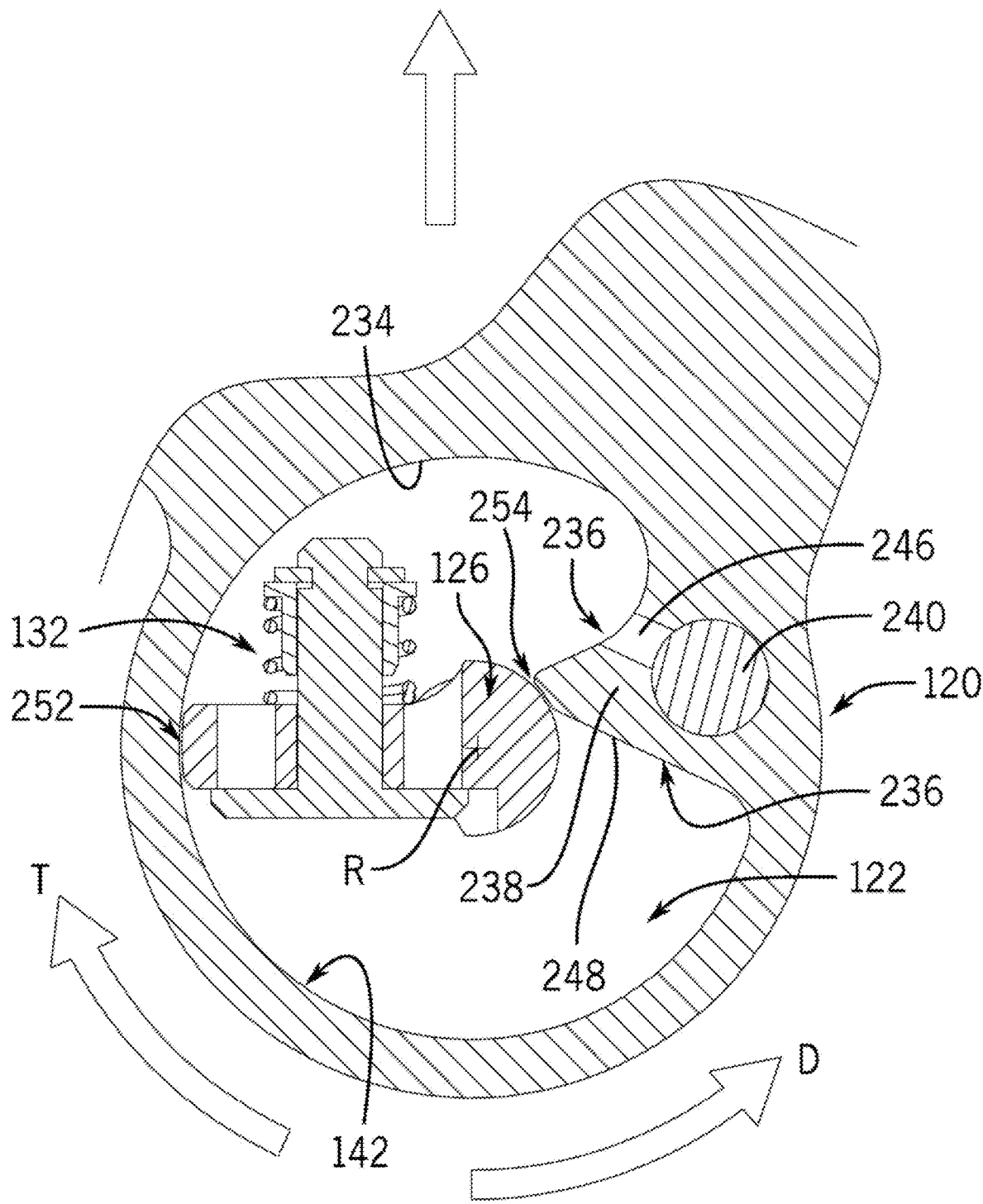
FIGS. 15 and 16 are cross-sections, like the cross-section of FIG. 10A, but depicting the portions of the fluid damper and the check valve in two other positions during use.

FIG. 10A shows the rear derailleur 80, including the shaft 126 in a first rotational position, such as a normal operating position with the damper 90 in a normal state. FIG. 15 shows the shaft 126 after the shaft and the cage 93 have rotated about the cage rotation axis R in the damping direction D. In this example, the vane 180 and shaft have rotated in a direction, which reduces the volume of the damping chamber 184. Thus, fluid will have been pushed into the return chamber 182 via the second flow paths 250, 252, and 254. Movement from the position in FIG. 10A to the position in FIG. 15 may have occurred because of a lower velocity gear shift operation or a higher velocity impact situation experienced by the derailleur 80 and cage 93. The amount of damping force exerted in the damping direction D by the damper 90 would be proportional to the rotational speed of the shaft 126. Further, the amount of damping force varies according to the rotational position of the cage 93, which determines the volume of the damping chamber 184.

The damping force can be varied in the damper 90 by changing the viscosity of the fluid in the fluid cavity 122. A higher viscosity fluid will result in higher damping forces, while a lower viscosity fluid will result in lower damping forces. The fluid cavity 122 may be filled with an appropriate fluid having a desired viscosity at the factory where the damper 90 is assembled. In one example, the original fluid may remain in the damper 90 for the life of the rear derailleur 80. Alternatively, a user could disassemble the rear derailleur 80 to replace the factory installed fluid with a fluid of different viscosity. In this manner, a user may change or vary the damping characteristics of the damper 90 without changing any other component of the rear derailleur. At the design or manufacturing stage, the damping force can be varied in the damper 90 by altering the volume of the cavity, and/or by altering the number and/or size of the second flow paths, and/or the like.

When the cage 93 and shaft 126 are rotated in the damping direction D, tension in the chain C is reduced. It is thus desirable for the cage to quickly rotate in the opposite chain tensioning direction T, as shown in FIGS. 3, 5, and 10A. For this to occur, fluid must flow back from the return chamber 182 to the damping chamber 184. However, if the only flow paths were the second flow paths 250, 252, and 254 for the fluid to return, the return rotation would be slow and delayed. Slow return rotation would result in a slack chain, which can inhibit performance of the drivetrain 58, permit the chain C to jump gears, or even permit the chain to fall off entirely.

Figure 16:
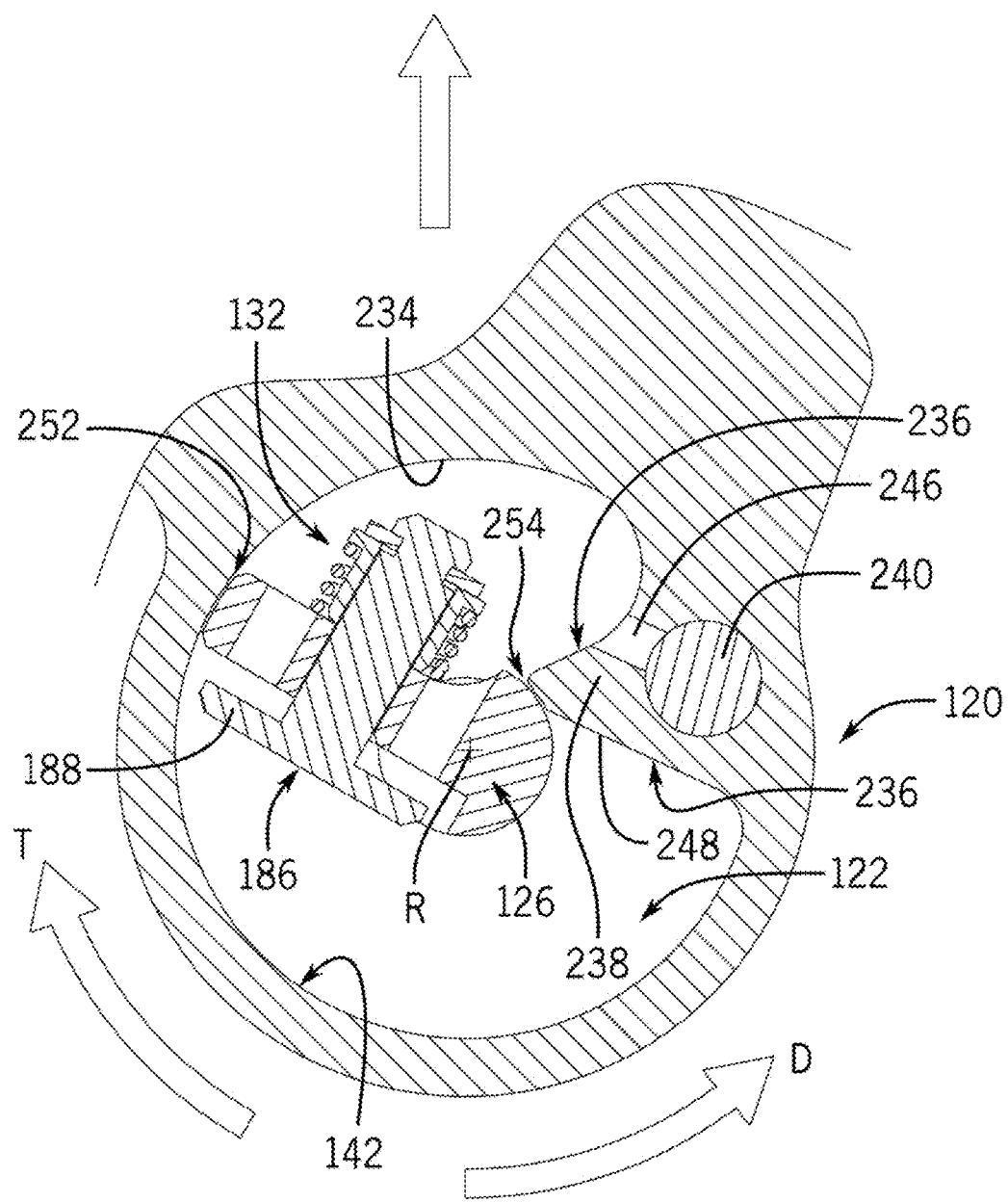

FIG. 16 illustrates how the shaft 126 and thus the cage 93 rotates in the chain tensioning direction T. In order for the shaft 126 and cage 93 to rotate in the chain tensioning direction T, fluid must flow from the return chamber 182 to the damping chamber 184 quickly and freely. The check valve 132 provides this function. The fluid pressure in the return chamber must be sufficient to overcome the force of the valve spring 195. When this occurs, fluid pressure in the flow holes 194 will push the head 188 of the poppet 186 away from the surface of the vane 180 against the bias force of the valve spring 195. The fluid can then easily and freely pass through flow holes 194 in the vane 180. Thus, fluid can freely pass from the return chamber 182 to the damping chamber 184 without being forced through the second flow paths 250, 252, and 254. The vane 180 and the shaft 126 can thus easily move through the fluid in the chain tensioning direction T. Therefore, very little, if any, damping force is exerted on the cage 93 when rotating in the chain tensioning direction T.

According to one aspect of the disclosed damper 90, referring to FIGS. 6, 9, and 10A-10C, the closed-cell foam resilient body 240 is disposed in the auxiliary bore 242 in the housing 120 within the cavity 122. The resilient body 240 is in fluid communication with the return chamber 182 via a shallow restrictive or constrictive flow channel 246 along the shelf 238 in the housing. The auxiliary bore is rather isolated from the damping chamber by the check valve 132, the limited second flow paths 250, 252, 254, and the restrictive nature of the flow channel 246. This isolates or protects the movable body, i.e., the resilient body 240 in this example, during dynamic operation of the fluid damper 90 when damping force is required and generated. The function of the resilient body 240 is to compensate for fluid expansion within the enclosed fluid cavity 122 caused by temperature increase in the fluid. The resilient body 240 does so by moving or changing state, i.e., compressing or expanding as fluid volume changes occur. The fluid temperature may increase due to the ambient temperature of the surroundings to which the bicycle 50 is exposed. The fluid temperature may also increase from heat or energy dissipated to the fluid from damping action exerted by the damper 90 from repeated motion of the cage 93.

Figure 10C:
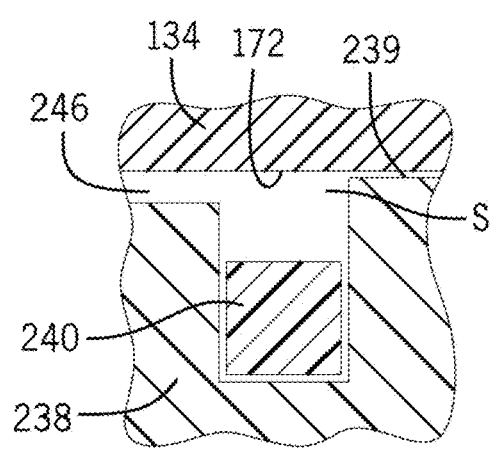
FIG. 10C is the compensation device depicted in FIG. 10B but in a compressed state.

As the temperature of a fluid increases, the fluid will expand. Without the compensation device, such as the resilient body 240, fluid expansion would exert a large internal pressure within the fluid cavity 122 on the housing 120. Such a pressure increase may potentially cause damage to the damper 90 or limit or inhibit its function. By employing a compensation device, such as the resilient body 240, the volume of the fluid cavity 122 may increase to compensate for the expanding fluid. In this example, the foam material of the resilient body 240 will be compressed down into the auxiliary bore 242 as expanding fluid is pushed through the flow channel 246 into the expansion chamber S (see FIGS. 10B and 10C). Compressing the resilient body 240 to a compressed state reduces the volume of the foam material, which increases the size of the expansion chamber S, as depicted in FIG. 10C. This increases the overall volume of the return chamber 182 and thus the fluid cavity 122 to compensate for the increasing volume of the fluid. Thus, the resilient body 240 prevents the expanding fluid from exerting an excessive pressure within the fluid cavity 122 on the housing 120. As the temperature of the fluid returns to its original level or normal state, the resilient body 240 can expand to its original volume within the auxiliary bore 242. This decreases the size of the expansion chamber S, which reduces the volume of the return chamber 182 and thus the cavity 122, as depicted in FIG. 10B.

It is important that the compensation device not be in direct communication with the damping chamber 184. In this example, if the resilient body 240 were in direct communication with the damping chamber 184, then the pressure increase in the damping chamber caused by movement in the damping direction D of the shaft 126 and vane 180 would compress the resilient body 240. This would result in a reduction or complete loss of any damping force until the resilient body 240 became fully compressed. In other words, compression of the resilient body 240 and volume increase of the expansion chamber S would compensate for the pressure increase in the damping chamber instead of the increased fluid pressure creating the desired damping force or action against rotation of the shaft 126 and vane 180.

Another aspect of the disclosed damper 90 is described referring to FIG. 8. In this example, the gland or annular space, within which the dynamic O-ring 160 is received, is formed by surfaces within the recess 162 of the bearing 134 and by an interior facing 260 of the cap 136. Thus, the dynamic O-ring 160 tends to remain stationary relative to the bearing 134 and the cap 136 when the shaft 126 rotates about the cage rotation axis R. If, alternatively, the gland was formed within the outer circumference shaft 126 (for example, by a groove in the bearing section 146 of the shaft), then the dynamic O-ring 160 would tend to rotate along with the shaft. Experience has shown that if the O-ring 160 were to rotate along with the shaft 126, this would tend to cause leakage of fluid from the system. Furthermore, in this disclosed example, the exposed and normal inner diameter of the dynamic O-ring 160 should preferably not be less than the corresponding diameter of the bearing section 146 of the shaft 126. This geometry further aids in preventing the dynamic O-ring 160 from "grabbing onto" the shaft 126 and rotating relative to the bearing 134 and the cap 136. Experience has again shown that optimal sealing is achieved when relative rotation occurs between the shaft 126 and the dynamic O-ring 160; not between the dynamic O-ring and the bearing 134 and the cap 136.

The dynamic seal, such as the O-ring 160, may also be configured so that the bearing 134 fixes the dynamic O-ring 160 in both axial directions as shown in the example of FIG. 14. For example, the dynamic O-ring 160 may be configured to contact the recess 162 on the inner circumferential surface 164, a first axial surface 163, and a second axial surface 165. Thus, in alternative embodiments, the dynamic O-ring 160 may contact the second axial surface 165 or the cap 136. The O-ring may be configured to simultaneously contact the first and second axial surfaces 163, 165. Alternatively, the O-ring 160 may be configured to contact only one of the first and second axial surface 163, 165, for instance to facilitate relative movement between the shaft 126 and the bearing 134 and/or to limit wear on the O-ring 160. In an embodiment, the O-ring 160 only contacts the bearing 134 and the shaft 126 without contacting the cap 136.

Yet another aspect of the disclosed damper 90 is described referring to FIG. 10A. The return chamber 182 may be arranged such that it is substantially above the damping chamber 184. Herein, 'substantially above' means that all of the return chamber 182 need not be above the damping chamber 184, but instead only that substantially all, most, or a majority should be above the damping chamber. In the event that fluid leaks out of the fluid cavity 122, and air (or a vacuum) is then introduced into the fluid cavity, the air will tend to slowly migrate upwards to the return chamber 182 due to its buoyancy. If, alternatively, air or a vacuum remained trapped in the damping chamber 184, the air or vacuum would cause an undesirable reduction in damping force due to the motion of the shaft 126 and vane 180 in the damping direction D compressing the air or vacuum. Adequate damping would be achieved only after the air or vacuum in the damping chamber 184 had been compressed. Therefore, it is desirable to configure the fluid cavity 122, as shown in FIG. 9, such that air tends to migrate into the low pressure chamber (L), where it will not adversely affect damping performance.

Still another aspect of the disclosed damper 90 resides in the size and shape of the damper, and more particularly in the ratio of the width or depth of the damper to the diameter of the damper. Because of the arrangement of the various parts relative to each other, the damper 90 may an overall depth or width, as measured along the cage rotation axis R, that is less than the overall diameter, centered about the axis R. For example, the damper 90 may have an overall depth or width of about 29 mm and an overall diameter of about 40 mm. Advantageously, this ratio may create or provide additional clearance between the foot of a rider and the rear derailleur 80, minimizing the chance of a collision between the rider's foot and part of the derailleur.

In order to fill the fluid cavity 122 of the housing 120 with fluid such as oil, as noted above, the following assembly procedure may be performed. Referring to FIGS. 6 and 8, the check valve 132 is assembled to the vane 180 on the shaft 126. The stem 190 of the poppet 186 is inserted through the hole 192 in the vane 180. The valve spring 195 is then installed over the stem 190. The spring stop 196 is positioned on the free end of the stem 190 against the end of the valve spring 195 and pushed onto the stem to compress the spring. The snap ring 198 is then snapped into the groove 200 on the end of the stem 190 to secure the poppet. The shaft 126 is then positioned within the fluid cavity 122 in the housing 120 with the first axial end 128 received in the blind bore 140 in the end wall 138, as shown in FIGS. 6 and 8. With the housing 120 oriented with the access opening 124 to the fluid cavity 122 facing up, as shown in FIGS. 6 and 8, fluid or oil is introduced into the fluid cavity. The fluid cavity 122 is filled until the oil level reaches approximately the level of the female threads 166 within the access opening 124.

The static O-ring 154 is installed in the groove 156 on the outer surface 158 of the bearing 134. The bearing 134 is inserted into the access opening 124 of the housing 120. As the bearing 134 is pushed down through the fluid or oil, excess fluid is displaced upward and escapes through the radial clearance gap between the inner surface 164 of the bearing and the corresponding outer diameter of the bearing surface 148 on the bearing section 146 of the shaft 126. The bearing 134 is pushed downward until contacting the bearing stop 170 within the fluid cavity 122 of the housing 120. At this stage, the damping chamber 184 and the return chamber 182 are completely full with fluid or oil and are each free of air, whereas any excess fluid has escaped upward, as previously described. The dynamic O-ring 160 is then installed in the recess 162 by pushing the O-ring down onto the bearing section 146 and into the recess, which is open at the exterior side of the bearing 134 (see FIG. 8). The excess fluid from within the access opening 124 that had previously escaped the fluid cavity 122 can then be removed. The cap 136 is then threaded into the access opening 124 on the housing 120 until the interior facing side 260 of the cap contacts the corresponding side of the bearing 134 and clamps the bearing against the bearing stop 170. The damper 90 is completed at this stage.

The assembled damper 90 can then be assembled with the rear derailleur 80. As shown in FIGS. 3, 5, 8, 11 and 12, the tensioner spring 204 can be installed in the channel 206 with the first prong 229 of the tensioner spring received in the hole 212 in the channel. The torque carrier 210 can be inserted into the recess 214 and onto the double-D shaped second axial end 130 of the shaft. The cage 93 can then be placed over the damper 90 with the chamfered hole 218 aligned with the double-D hole 212. The bolt 220 can be inserted into the chamfered hole 218 in the torque carrier and loosely threaded into the shaft bore 216 in the second axial end 130 of the shaft 126. The second prong 230 of the tensioner spring 204 can then be engaged with the receiving hole 232 in the cage 93. The cage can then be rotated to load the tensioner spring 204 until the through holes 226 in the cage 93 are aligned with the blind holes 224 in the torque carrier 20. The screws 228 can then be inserted and threaded into the blind holes 224 of the torque carrier 210 and the screws and the bolt 220 can be tightened. To complete assembly of the cage 93 and the damper 90. The cage and damper can then be assembled to the other parts of the derailleur 80 as is known in the art.

In the example of FIGS. 1-16, the components of the fluid damper 90 may be fabricated from any suitable materials and material combinations. In one example, the housing 120 may be made from aluminum, glass-filled nylon or other suitable metal, plastic, or composite materials. The bearing 134 may be made from a suitable metallic material or from a non-metallic material, such as a thermoplastic. In one example, the bearing may be made from an acetal resin or compound such as Delrin®, nylon, or the like. Likewise, the cap 136 may be made from similar materials, as desired. The shaft 126 may also be made from a metallic material or non-metallic material having sufficient strength in torsion. In one example, the shaft 126 may be made from aluminum or steel. Both the tensioner spring 204 and valve spring 195 can be made from spring steel or the like and each may be tuned to provide a specific desired load or force during use. The valve spring 195 may be tuned to provide a relatively light spring load so that the check valve freely opens when needed during use. However, the valve spring 95 should by stiff enough so as to avoid 'valve float' during use. In other words, the valve spring 195 should be strong enough so as to be capable of very quickly closing the poppet 186 through the highly viscous fluid or oil during use. Any delay in the check valve 132 closing can cause undesirable fluid transfer from the damping chamber 184 to the return chamber 182, which would reduce the damping effects of the damper 90.

Many modifications and changes may be made to the disclosed fluid damper without deviating from the intended function. The housing 120 may vary in size and shape, as can the fluid cavity 122 therein. The location, number, arrangement, and features of the chambers 182, 184, the check valve 132, the first flow path(s), and the second flow path(s) may also vary from the damper 90 as described above. The configuration of the shaft 126, bearing 134, and/or cap 136 can also vary from the above described fluid damper example. However, the disclosed fluid damper 90 has a fairly simple construction and yet is very effective in operation. The fluid damper generally has a housing with a main cavity open at one end, a seal closing off the opening, and a threaded cap to retain the assembly in the assembled and fluid filled condition.

Figure 17:
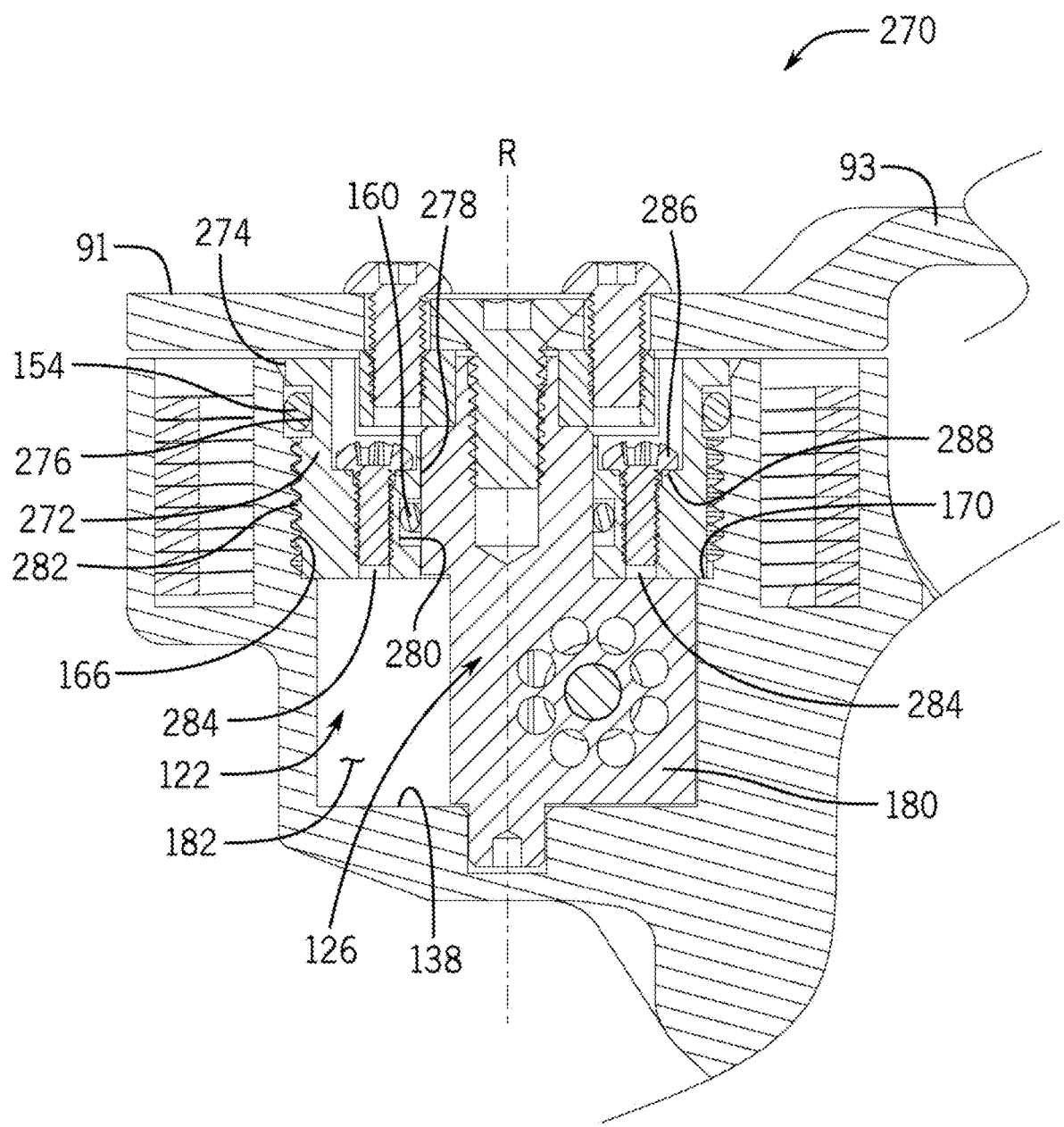
FIG. 17 is a cross-section view, which is like FIG. 8, but that shows an alternate example of a fluid damper in accordance with the teachings of the present disclosure.

FIG. 17 shows one alternative example of a modified fluid damper constructed in accordance with the teachings of the present disclosure. In this example, a damper 270 is much the same as the above-described damper 90. Thus, like components are not further described in detailed below but have been given the same reference numbers as the corresponding components of the above-described damper 90. In this example, the bearing 134 and the cap 136 have been replaced by a single component, i.e., a seal head 272. In this example, the seal head 272 has a ring shape with an outer surface 274 that carries a seal groove 276 for the static O-ring 154 and an inner surface 278 that carries another seal groove 280 for the dynamic O-ring 160. The seal head 272 also external male threads 282 on the outer surface (below the static O-ring 154 in the view of FIG. 17). These threads are configured to engage the female threads 166 within the access opening 124 (though the female threads are positioned deeper into the fluid cavity in this example).

The seal head 272 has a pair of bleed ports 284, which are threaded, and which communicate between the outside of the housing 120 and the fluid cavity 122 when the seal head 272 is installed in the housing. Two sealing or bleed screws 286 are provided and each has an O-ring 288 or seal that is integrated under the head of the screw. The screws 286 can be threaded into the bleed holes 284 to seal the bleed ports 284 in the seal head 272. The screws 286 in one example can seal the fluid cavity 122 up to 6,000 psi of pressure.

In this example, the fluid cavity 122 of the damper 270 can be filled via the following assembly procedure. The check valve 132 is pre-assembled to the shaft 126 and the shaft is positioned in the fluid cavity as described above for the damper 90. Fluid is then introduced into the fluid cavity 122 in the housing 120 until it covers all of the threads 166 in the access opening 124 of the housing 120. The static O-ring 154 and the dynamic O-ring 160 are both pre-assembled to the seal head 272 in this example. The seal head 272 is then threaded into the access opening 124 of the housing 120. As the seal head 272 moves downward through the fluid or oil, the excess fluid is forced upwards through the bleed ports 284 in the seal head. The seal head 272 is threaded into the access opening 124 of the housing 120 until the seal head abuts the bearing stop 170. At this stage, any excess fluid will have escaped through the bleed ports 284 in the seal head 272 and the return chamber 182 and damping chamber 184 are completely filled with the fluid or oil. The bleed screws 286 are then threaded into the bleed ports 284 in the seal head 272 with the heads and O-rings 288 seated tightly against the seal head. The bleed screws 286 thus seal the bleed ports 284 to prevent any further fluid or oil from escaping the fluid cavity 122. The damper 270 in this example is now assembled at this stage and ready to be attached to the cage, as described above.

Figure 18:
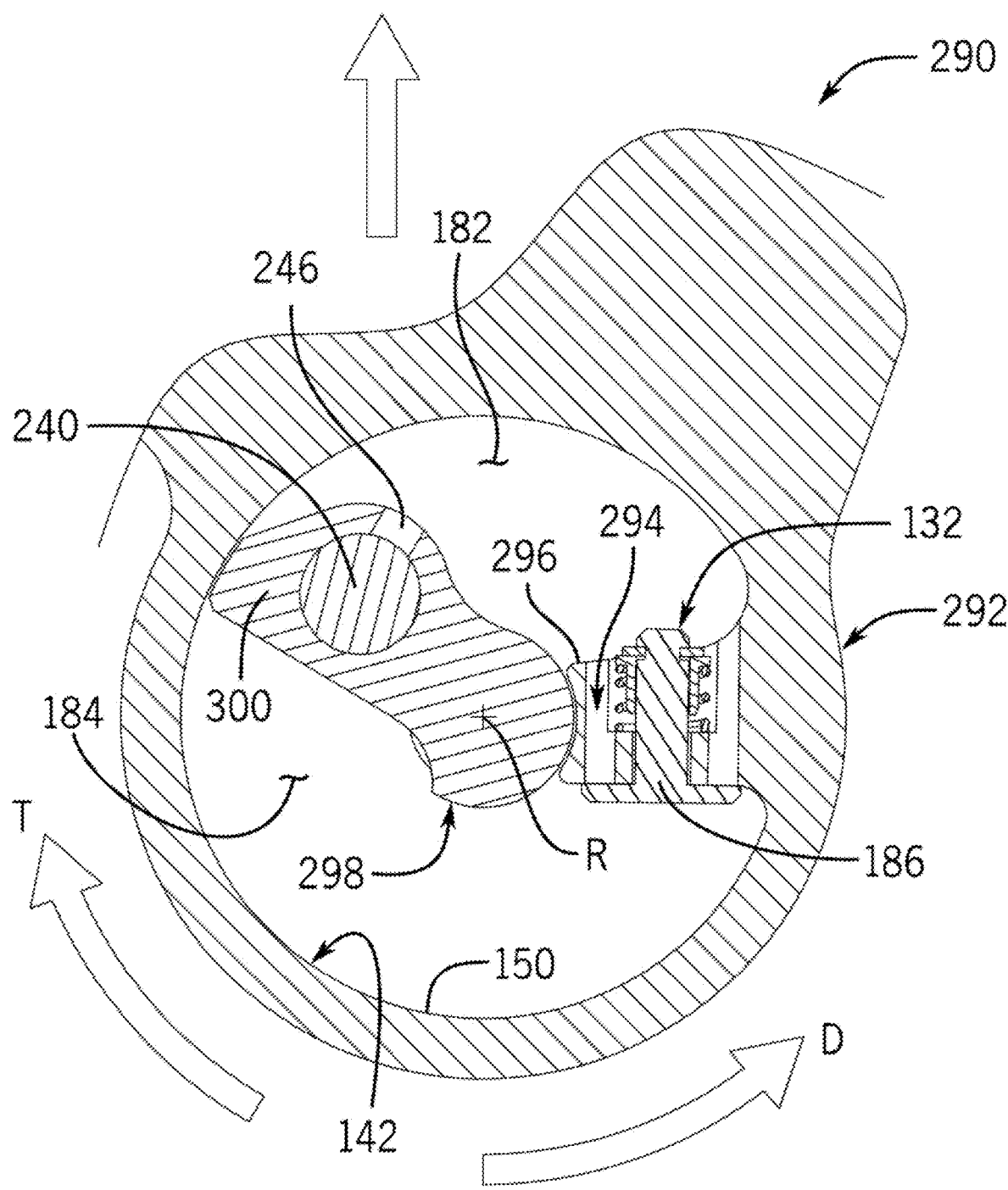
FIGS. 18-22 are cross-section views, which are like FIG. 10A, but that show further alternate examples of fluid dampers in accordance with the teachings of the present disclosure.

FIG. 18 shows another alternative example of a modified fluid damper constructed in accordance with the teachings of the present disclosure. In this example, a damper 290 is much the same as the above-described damper 90. Thus, like components are not further described in detailed below but have been given the same reference numbers as the corresponding components of the above-described damper 90. In this example, rather than being incorporated into the shaft, the check valve 132 is incorporated into a portion of a modified housing 292. The check valve 132 is still configured and arranged to block fluid flow from the damping chamber 184 to the return chamber 182 and to still allow free flow of fluid from the return chamber 182 to the damping chamber 184. In this example, the check valve 132 is positioned in an opening and recess 294 in a shelf 296 or wall within the cavity that replaces the earlier described shelf 238.

Also in this example, a shaft 298, which is modified from the earlier described shaft 126, also includes a vane 300 extending radially from the shaft. The shelf 296, in part, and the vane 300, in combination with the shelf 298, separate the damping chamber 184 from the return chamber 182 in this example. The compensation device in this example is carried on the movable vane 300 of the shaft 298 since the check valve 132 is carried on the shelf 298, which is a fixed portion of the housing 292. The compensation device in this example, however, is otherwise identical that of the damper 90. More specifically, the compensation device includes a blind auxiliary bore 242 in communication with the return chamber via a flow channel 246 formed in a top surface of the vane 300. A resilient body 240 of a closed cell foam material is received in the auxiliary bore 242 and defines an expansion chamber S between the body and the inner side or underside 172 of the bearing 134. The expansion chamber S is again in fluid communication with the return chamber 182 via the flow channel 246.

Figure 19:
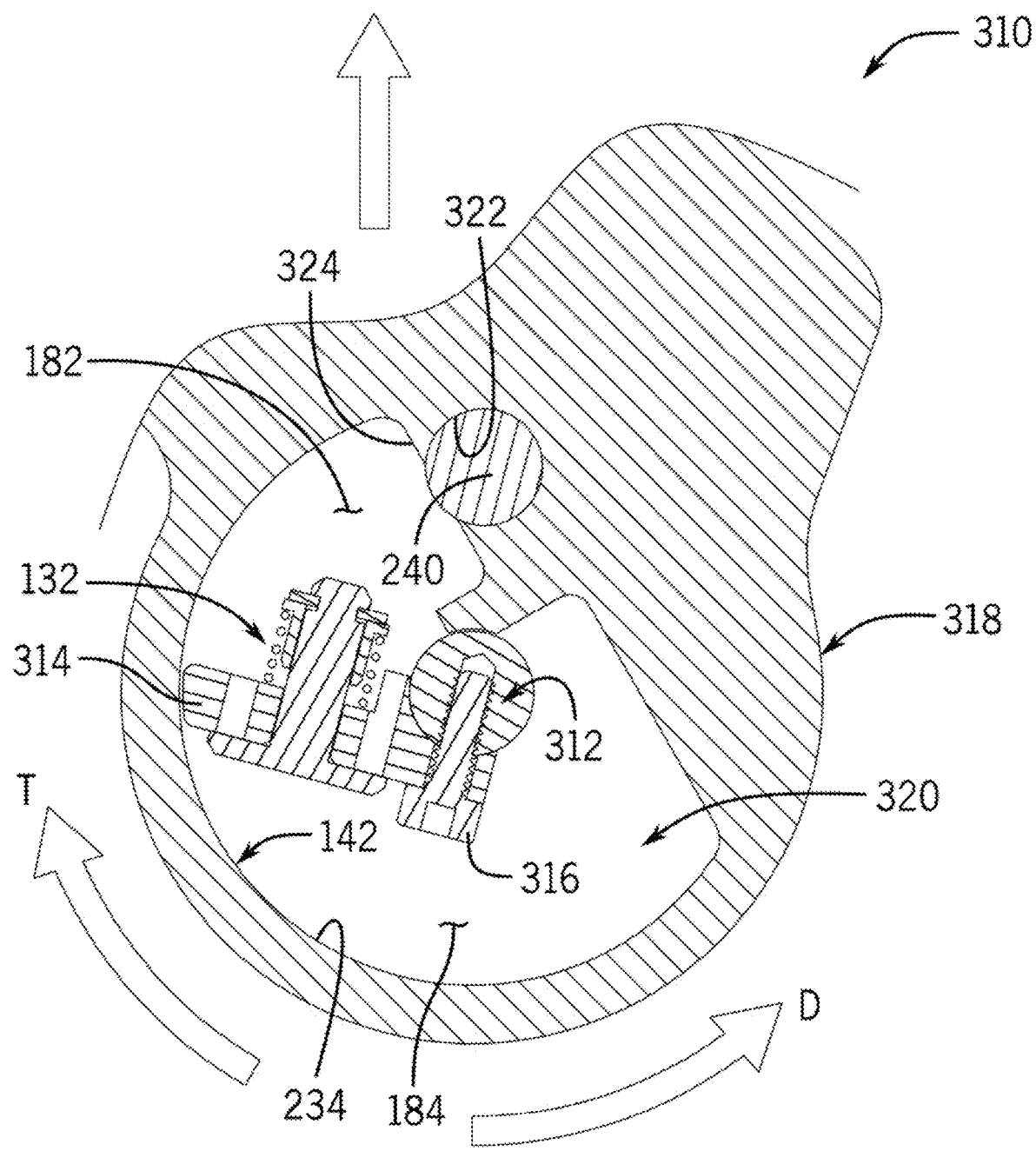

FIG. 19 shows another alternative example of a modified fluid damper constructed in accordance with the teachings of the present disclosure. In this example, a damper 310 is much the same as the above-described damper 90. Thus, like components are not further described in detailed below but have been given the same reference numbers as the corresponding components of the above-described damper 90. In this example, the damper 310 has a shaft 312 with a vane 314 that, rather than being integrally formed with the shaft as are the shaft 126 and vane 180, is a separate part. The vane 314 may be attached or fastened to the shaft 312, such as by one or more screws 316. Such a construction may allow the shaft 312 to have a less complex configuration to make the shaft simpler, easier, or less complicated to manufacture. This construction further allows the vane 314 and the shaft 312 to be made from different materials, if desired.

The damper 310 also includes a modified housing 318 with a fluid cavity 320 having a different configuration. This example indicates that the housing 318 and fluid cavity 320 can vary in shape, size, and configuration. The damper 310 also includes a modified compensation device. The compensation device in this example includes a blind auxiliary bore 322 that is formed less than a radial distance from a wall 324 of the fluid cavity 320. Thus, a portion of the wall 324 is open to the return chamber 182 over a height or depth of the auxiliary bore 322. As a result, the expansion chamber S is disposed at the top of the resilient body 240 and directly communicates with the return chamber. Further, the resilient body 240 may compress along the wall 324 where the body is exposed directly to the return chamber 182, to permit direct volume expansion of the return chamber as well.

Figure 20:
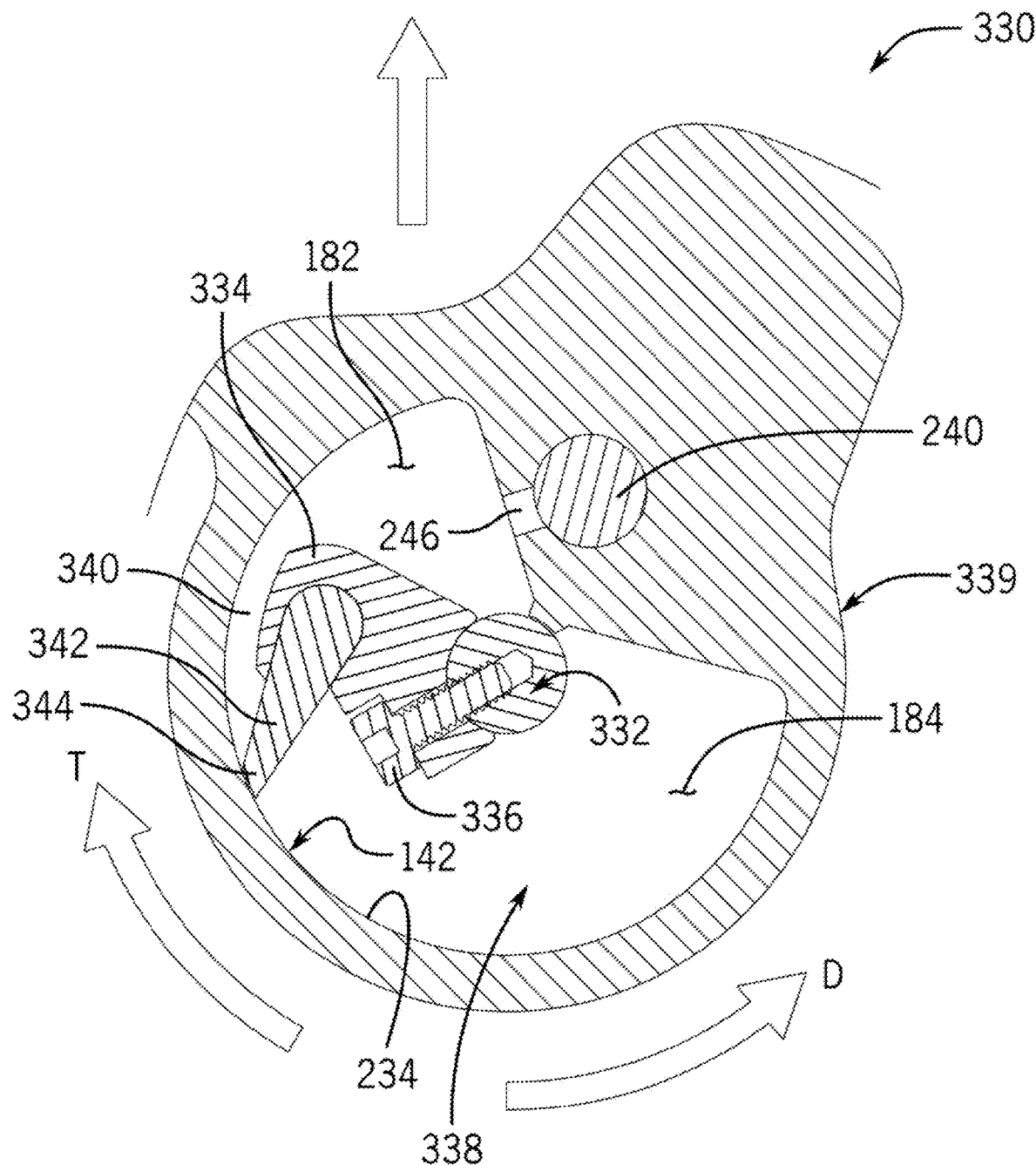

FIG. 20 shows another alternative example of a modified fluid damper constructed in accordance with the teachings of the present disclosure. In this example, a damper 330 is much the same as the above-described damper 90. Thus, like components are not further described in detailed below but have been given the same reference numbers as the corresponding components of the above-described damper 90. In this example, the damper 330 has a shaft 332 with a separate vane 334 that is attached or connected to the shaft, such as by one or more screws 336. The end of the vane 334 terminates short of the circular portion 234 of a surface such as the side wall 142 within a fluid cavity 338 in the housing 339. A gap 340 remains between the side wall 142 and the end of the vane 334. The gap 340 defines the first flow path between the return chamber 182 and the damping chamber 184. A sealing member, such as a resilient or flexible wiper seal 342, is coupled to, i.e., fixed to and extends from the vane 334. The wiper seal 342 may be made from any suitable material, such as an oil safe elastomeric material.

The wiper seal 342 in a natural or static state is disposed such that its free end 344 wipes along and is biased against the side wall 142 within the fluid cavity 338 of the housing 120. However, the wiper seal 342 is also angled in a specific way so as to act as a form of a check valve, replacing the check valve 132 of the prior examples. Specifically, when the shaft 332 rotates in the damping direction D, the resulting fluid pressure in the damping chamber 184 biases a free end of the wiper seal 342 in a closed position firmly against the side wall 142 of the fluid cavity 338, providing a high resistance to fluid flow and essentially closing the gap 340, i.e., the first flow path. Fluid will then primarily flow from the damping chamber 184 to the return chamber 182 via the second flow paths, such as the flow paths 250 above and/or below the vane 334 and wiper seal 342 and the flow path 254 between the shaft 332 and a wall of the fluid cavity 338. When the shaft 332 rotates in the opposite chain tensioning direction T, the resulting higher fluid pressure in the return chamber 182 deflects or bends the free end of the wiper seal 342 away from the side wall 142 of the fluid cavity 338 in an open position. This opens the gap 340 and thus the first flow path, allowing a free flow of fluid from the return chamber to the damping chamber 184.

Figure 21:
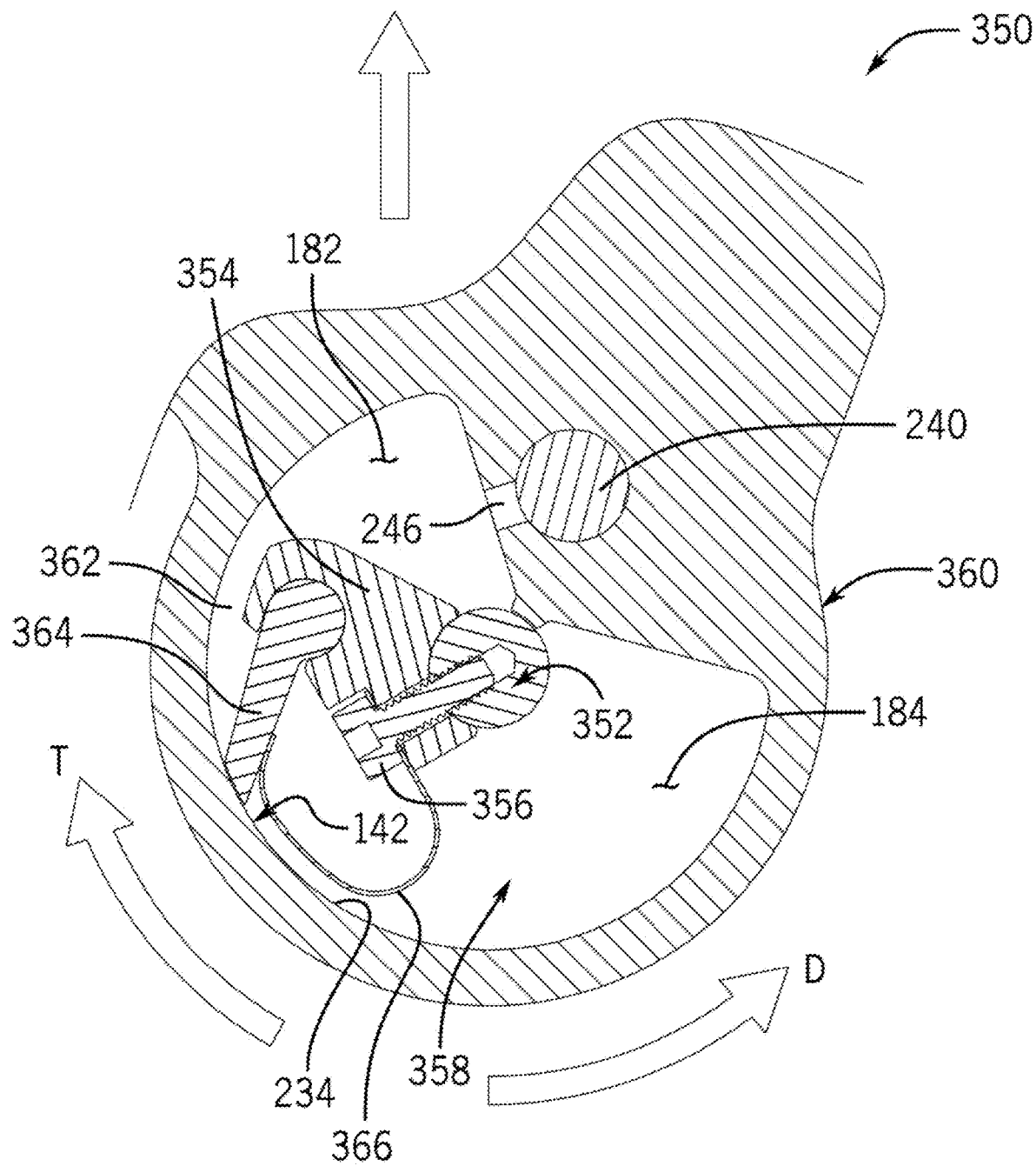

FIG. 21 shows another alternative example of a modified fluid damper constructed in accordance with the teachings of the present disclosure. In this example, a damper 350 is much the same as the above-described damper 90. Thus, like components are not further described in detailed below but have been given the same reference numbers as the corresponding components of the above-described damper 90. In this example, damper 350 has a shaft 352 with a vane 354 formed as a separate part from the shaft. The vane 354 is again attached or connected to the shaft 352, such as by one or more screws 356. The end of the vane 354 terminates short of the circular portion 234 of the side wall 142 within a fluid cavity 358 in the housing 360. A gap 362 remains between the side wall 142 and the end of the vane 354. The gap 362 defines the first flow path between the return chamber 182 and the damping chamber 184. A rigid wiping member 364 may be made of a rigid material such as plastic. The wiping member 364 is rotatably received in a recess in the vane 354.

A biasing element such as a spring 366 has one end held or retained to the shaft 352 by one of the screws 356. The other end of the spring 366 contacts a free end of the wiping member 364 and biases the free end of the wiping member against a surface such as the side wall 142 of the fluid cavity 358 within the housing 360. When the shaft 352 rotates in the damping direction D, fluid pressure in the damping chamber 184 further biases the free end of the wiping member 364 against the side wall 142 of the fluid cavity 358 in the housing 360 in a closed position. This results in a high resistance to fluid flow through the gap 362. When the shaft 352 rotates in the chain tensioning direction T, fluid pressure in the return chamber 182 deflects the free end of wiping member 364 away from the side wall 142 against the biasing force of the spring 366 to an open position. This allows free flow of fluid via the gap 362 from the return chamber 182 to the damping chamber 184.

Figure 22:
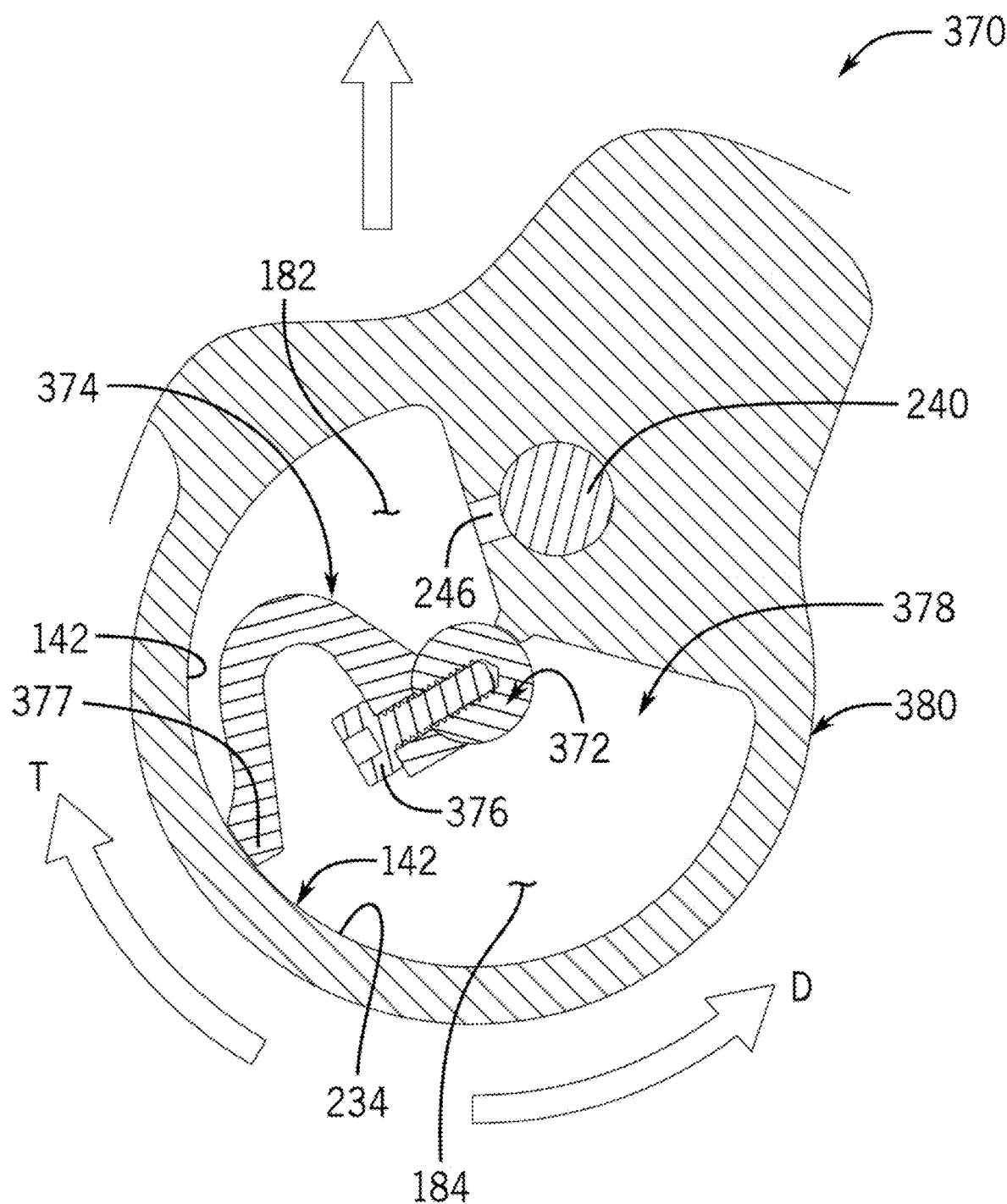

FIG. 22 shows another alternative example of a modified fluid damper constructed in accordance with the teachings of the present disclosure. In this example, a damper 370 is much the same as the above-described damper 90. Thus, like components are not further described in detailed below but have been given the same reference numbers as the corresponding components of the above-described damper 90. The damper 370 is similar to the dampers 330 and 350 described above. In this example, the damper 370 has a shaft 372 but does not have a separate vane or an integral vane. Instead, a C-shaped sealing member 374 has one end attached or connected to the shaft 372, such as by one or more screws 376. The sealing member 374 may be made of a flexible or resilient material. In a static state, the sealing member 374 may have a free end or other end 377 that is biased against a surface such as the wall 142 of a fluid chamber 378. When the shaft 372 rotates in the damping direction D, the resulting pressure in the damping chamber 184 energizes or biases the other end 377 of the sealing member 374 firmly against the side wall 142 of the fluid chamber 378 in a housing 380 in a closed position. This results in a high resistance to fluid flow from the damping chamber 184 to the return chamber 182. When the shaft 372 rotates in the chain tensioning direction T, the resulting pressure in the return chamber 182 deflects the free end 377 of the sealing member 374 away from the side wall 142 in an open position. This allows free fluid flow from the return chamber 182 to the damping chamber 184 via the first flow path between the side wall 142 and the other end 377 of the sealing member 374.

Figure 23:
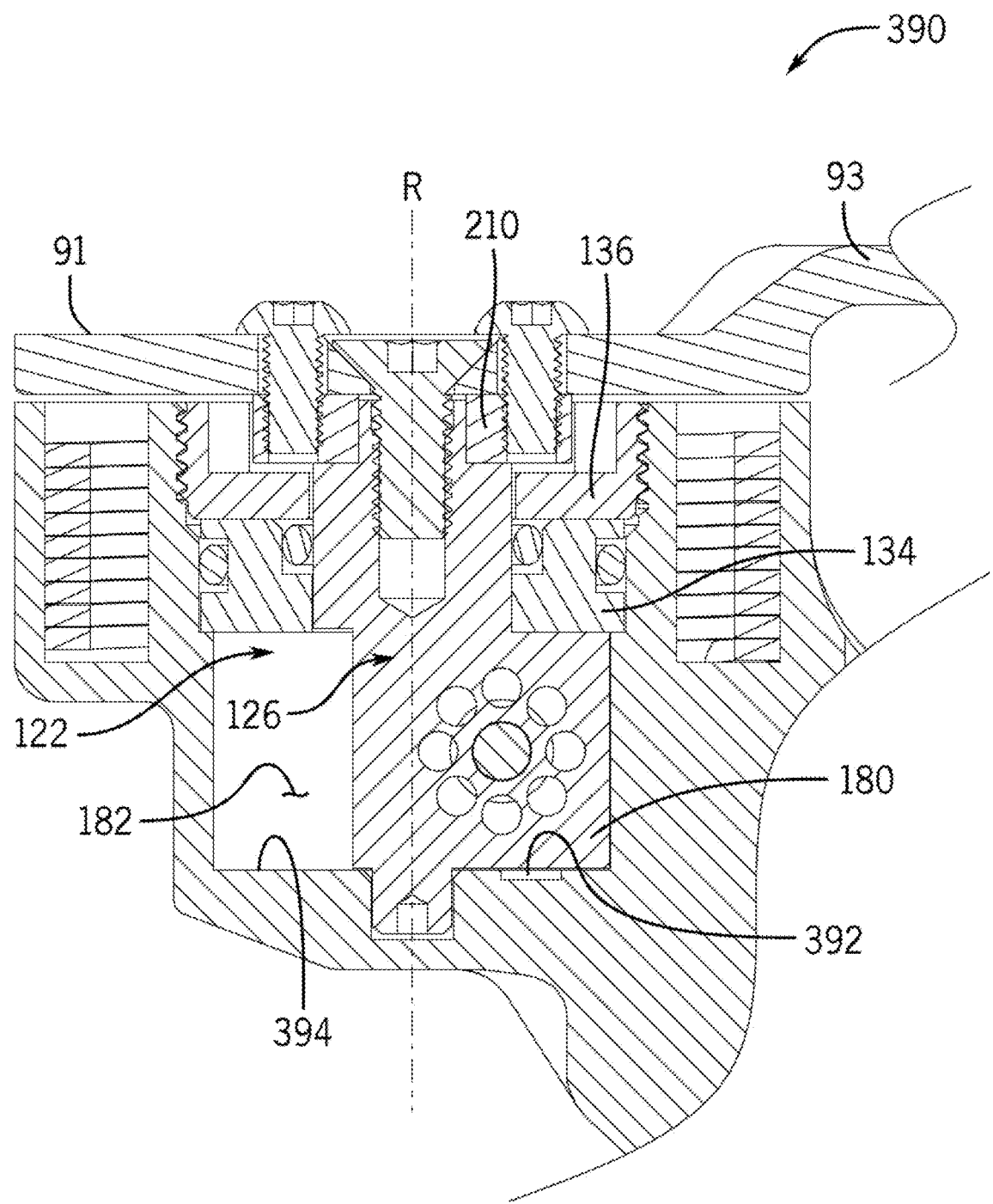
FIG. 23 is a cross-section view, which is like FIG. 8, but that shows yet another alternate example of a fluid damper in accordance with the teachings of the present disclosure.
Figure 24:
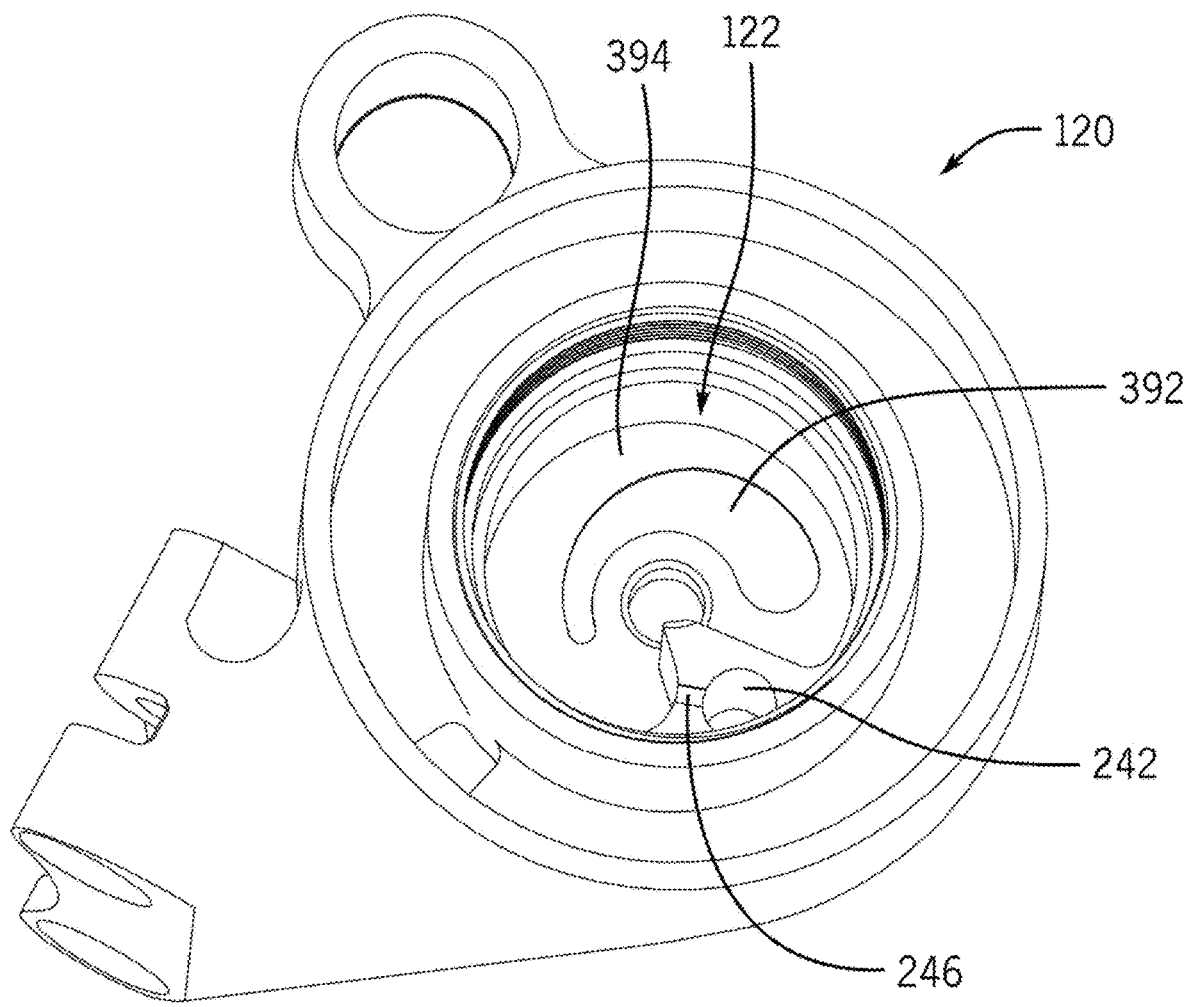
FIG. 24 is a perspective view of a housing of the fluid damper shown in FIG. 23.

FIGS. 23 and 24 show another alternative example of a modified fluid damper constructed in accordance with the teachings of the present disclosure. In this example, a damper 390 is substantially the same as the above-described damper 90. Thus, like components are not further described in detailed below but have been given the same reference numbers as the corresponding components of the above-described damper 90. In this example, as depicted in FIG. 23, the damper 390 includes a shallow recess 392 in the end wall 394 of the fluid cavity 122 in the housing 120. As shown in FIG. 24, the shallow recess 392 curves about the cage rotation axis R and has a variable width. The recess 392 provides an additional or modified second flow path in combination with or as a replacement for the second flow path 250 noted above below the vane 180. The recess 392 provides a flow path for fluid traveling from the damping chamber 184 to the return chamber 182 that varies depending on the rotational position of the shaft 126 and vane 180.

More specifically, as the shaft 126 rotates in the damping direction D, the resistance to fluid flow at any instant is inversely proportional to the width of the portion of the recess that is adjacent the axial edge of the vane 180. The recess 392 can become narrower as the shaft 126 rotates in the direction D to increasingly resist flow from the damping chamber 184 to the return chamber 182 to retain sufficient damping force. As the shaft rotates in the chain tensioning direction T, the recess can become wider to more quickly allow fluid to flow from the return chamber 182 to the damping chamber 184. The magnitude of the fluid damping force in the damping direction D will vary as a function of the angular position of the shaft 126. The specific shape of the recess 392 shown in FIG. 24 is only meant to be illustrative and not limiting. The shape of the recess 392 may be varied as needed to provide the desired damping characteristics as a function of the angular or rotational position of the shaft 126.

Figure 25:
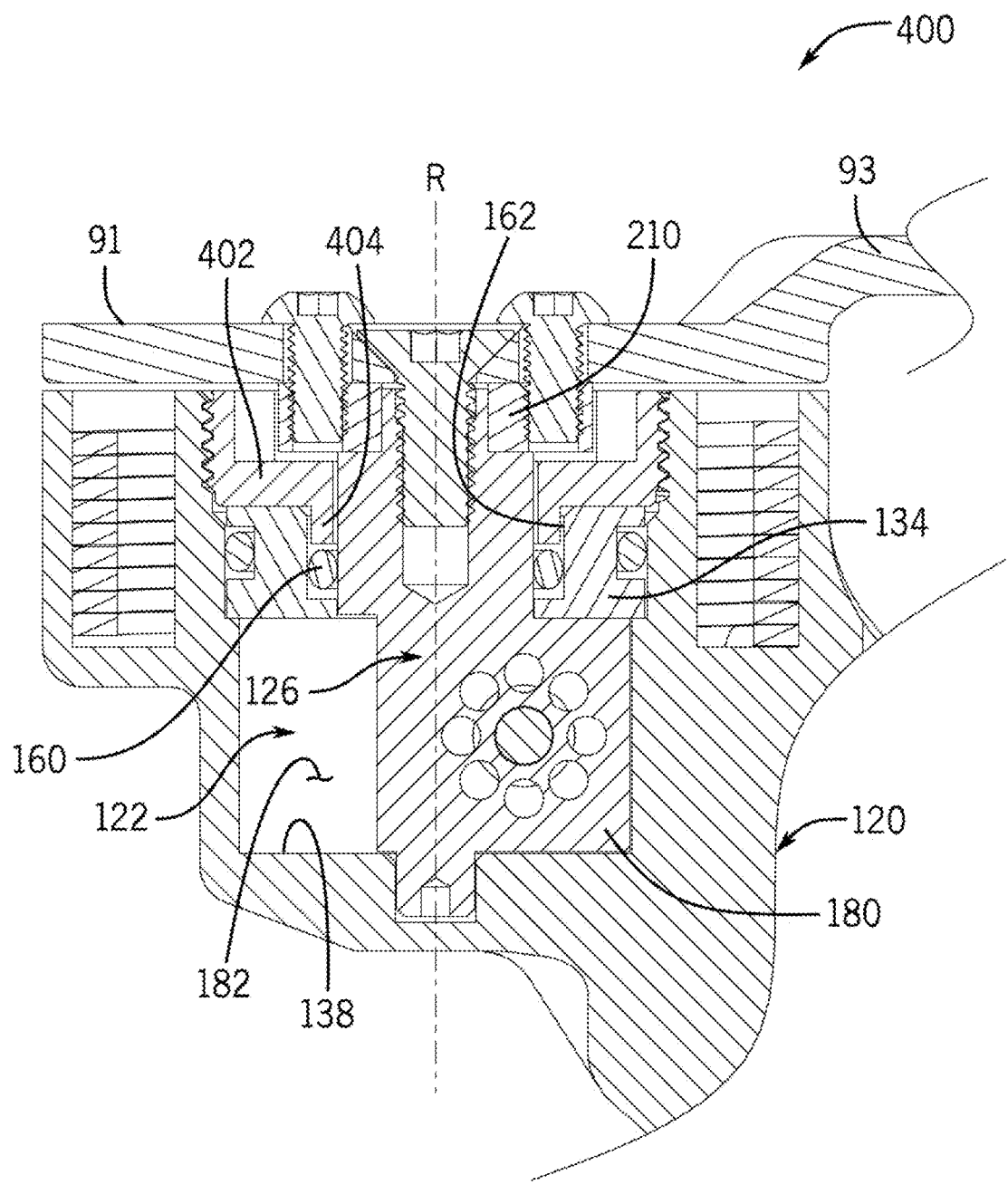
FIGS. 25-27 are cross-section views, which are like FIG. 8, but that show still further alternate examples fluid dampers in accordance with the teachings of the present disclosure.

FIG. 25 shows another alternative example of a modified fluid damper constructed in accordance with the teachings of the present disclosure. In this example, a damper 400 is substantially the same as the above-described damper 90. Thus, like components are not further described in detailed below but have been given the same reference numbers as the corresponding components of the above-described damper 90. In this example, the damper 400 has a cap 402 with an annular shoulder or rib 404 protruding from the interior facing side 260. The recess 162 in the bearing 134 for the dynamic O-ring 160 is deeper in this example. The annular rib or shoulder 404 is received in the recess 162 and resides adjacent the O-ring 160. During assembly, fluid in the recess 162, which holds the dynamic O-ring 160, is displaced by the annular rib or shoulder 404 and is forced into the damping chamber 184. This fluid increases fluid pressure in the damping chamber 184, which in turn causes the resilient body 240 or other compensation device to compress by an amount equal to the displaced fluid. The damping chamber 184 is thus in a pressurized state because the resilient body 240 exerts pressure on the fluid while trying to expand to it natural expanded state or size. This yields an advantage in that, in the event of a fluid temperature decrease causing a fluid volume reduction, the resilient body 240 can expand to compensate for the decrease in fluid volume. Without this feature, a vacuum would otherwise be created by the fluid volume reduction, resulting in a loss of damping force. Another advantage of pressurizing the damping chamber 184 in this manner is that any air bubbles or pockets trapped inadvertently in the fluid cavity 122 will also be compressed to a small volume, which will minimize any loss of damping force otherwise caused by such trapped air.

Figure 26:
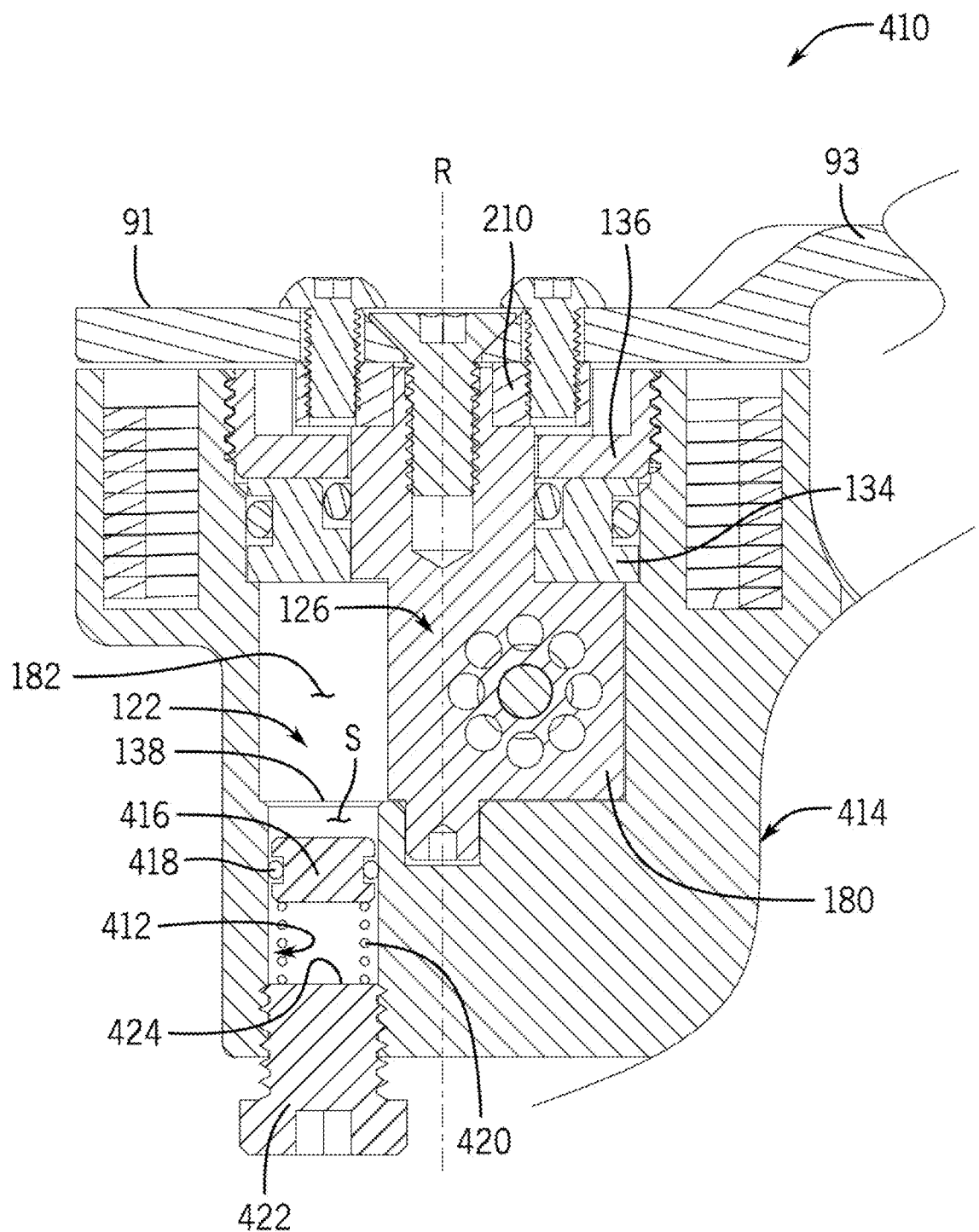
Figure 27:
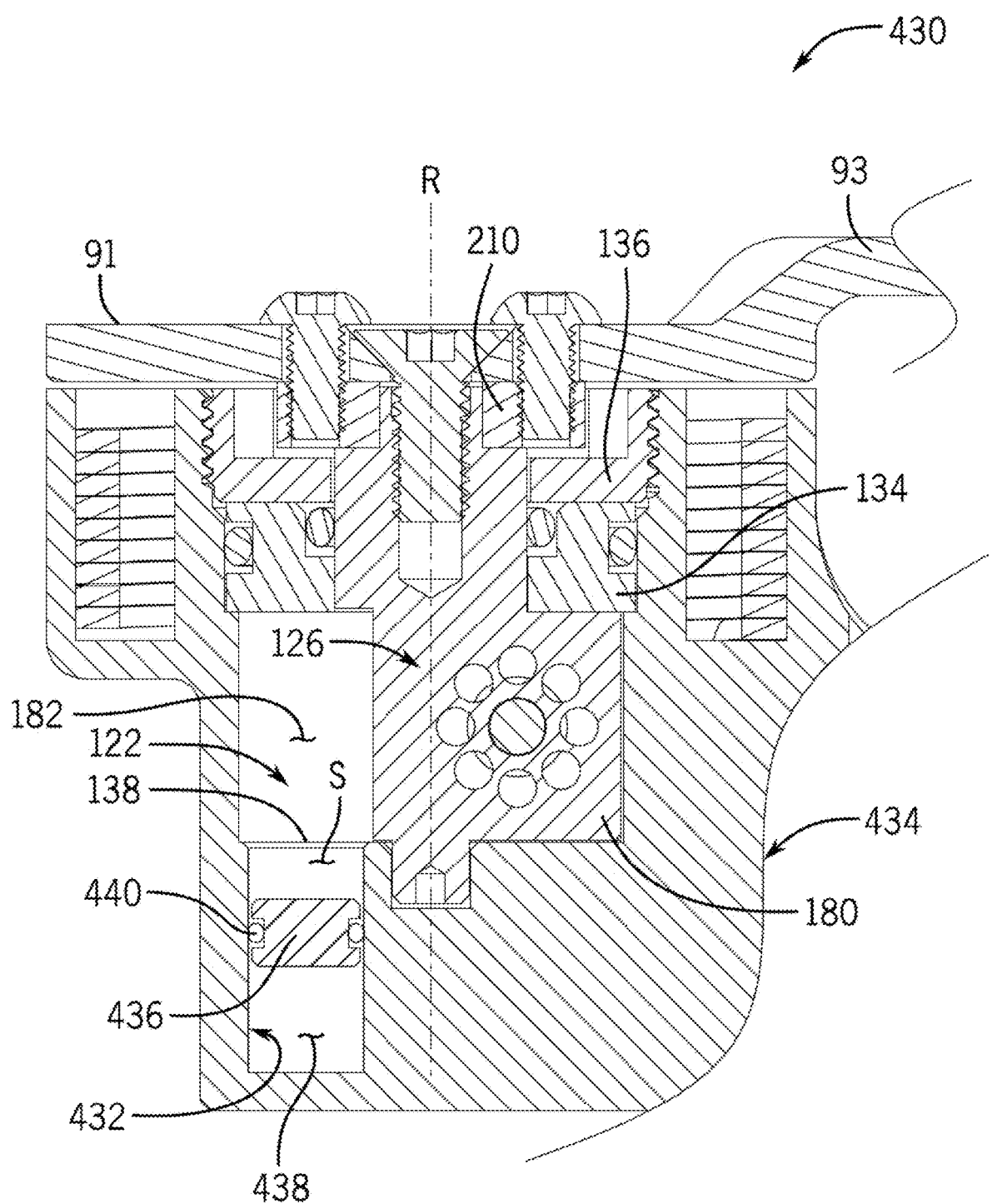

FIGS. 26 and 27 show additional alternative examples of modified fluid dampers constructed in accordance with the teachings of the present disclosure. In the examples of FIGS. 26 and 27, dampers 410 and 430 are much the same as the above-described damper 90. Thus, like components are not further described in detailed below but have been given the same reference numbers as the corresponding components of the above-described damper 90. In these examples, the dampers 410 and 430 each include an alternative compensation device that can be used in addition to the auxiliary bore and resilient body examples described above or as a replacement for the earlier described compensation device examples.

Referring to FIG. 26, the damper 410 has a compensation device with a bore 412 formed through a housing 414 of the damper. The bore 412 opens directly into the end wall 142 of the return chamber 182 within the fluid cavity 122 through the housing 414. A movable body in the form of a piston 416 with an O-ring seal 418 is slidably received in the bore 412. A spring 420 biases the piston 416 toward the return chamber 182. A surface of the piston 316 is exposed directly to the return chamber 182 in the fluid cavity 122. An adjustment screw 422 includes mechanical threads that engage threads in the opening of the bore 412. The end 424 of the screw 422 contacts the spring 420 to act as a spring stop. The screw 422 may also be adjusted to adjust the spring load, if desired. In use, the bore 412 defines an expansion chamber S on the side of the piston 416 facing the return chamber 182. The piston 416 can move according to and against the bias force of the spring 420 to change the size of the expansion chamber S, which is effectively a part of the return chamber 182 in this example. The expansion chamber S in this example can accommodate changes in fluid volume within the fluid cavity 122 caused by fluid temperature changes. However, the expansion chamber S can also accommodate changes in volume, to a degree, caused by leakage of fluid from the fluid cavity 122.

Referring to FIG. 27, the damper 430 also has a compensation device with a bore 432 formed by a housing 434. However, the bore 432 is a blind bore in the end wall 142 within the return chamber 182 in the fluid cavity 122 of the housing 434. A movable body in the form of a floating piston 436 with an O-ring seal 440 is slidably received in the bore 432. The expansion chamber S is formed within the bore 412 adjacent the piston 436 on the side of the piston facing the return chamber 182. Again, a surface of the piston 436 is exposed directly to the return chamber 182 in this example. Thus, the expansion chamber S is effectively a part of the return chamber 182 in this example as well. A closed air pocket 438 is formed within the bore 412 on the opposite side of the piston 436. The air pocket 438 may be filled with air, which biases the piston 436 toward the return chamber 182. The air pocket may be created when the piston 436 is installed from within the fluid cavity 122 during assembly of the damper 430. Alternatively, though not shown herein, the blind terminal end 424 of the bore 432 may include an optional valve for adding or adjusting the air pressure within the air pocket 438. In use, the piston 416 can move according to and against the bias force of the air pocket 438 to change the size of the expansion chamber S. The expansion chamber S in this example, can thus accommodate changes in fluid volume within the fluid cavity 122 caused by fluid temperature changes. However, the expansion chamber S can also accommodate changes in volume, to a degree, caused by leakage of fluid from the fluid cavity 122.

Each of the above-described examples of a fluid damper illustrates that the configuration and construction of the dampers can be varied in different ways. However, other examples are also certainly possible, different from those disclosed and described herein. The invention and the disclosure are not intended to be limited to only the examples of FIGS. 1-27.

Although certain fluid dampers, bicycle derailleurs, and have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle rear derailleur comprising:
   a base member mountable to a bicycle frame;
   a movable member movably coupled to the base member;
   a chain guide assembly rotatably connected to the movable member for rotation about a rotational axis, the chain guide assembly including a first guide member and a second guide member;
   a guide wheel rotatable about the rotational axis;
   a biasing element configured and arranged to bias the chain guide assembly for rotation in a first rotational direction about the rotational axis with respect to the movable member;
   a fluid damper comprising a fluid cavity containing a volume of fluid, the fluid damper disposed at a connection of the chain guide assembly and the movable member and comprising a shaft rotatable about the rotational axis and configured to apply a damping force to the chain guide assembly when the chain guide assembly rotates in a second rotational direction opposite to the first rotational direction;
   the first guide member rotationally fixed to the shaft, disposed between the movable member and the guide wheel;
   the second guide member rotationally fixed to the first guide member such that the guide wheel is disposed between the first and second guide members; and
   a first guide fixing member configured to affix the second guide member to the shaft, the first guide fixing member contacting both the second guide member and the shaft, and
   a second guide fixing member configured to fix the first guide member to the shaft.

2. The bicycle rear derailleur of claim 1, wherein the fluid cavity comprises a damping chamber arranged to provide the damping force and a return chamber in fluid communication with the damping chamber, and wherein the shaft comprises a vane radially extending from the shaft and dividing the fluid cavity to define the damping chamber and the return chamber on opposite sides of the vane.

3. The bicycle rear derailleur of claim 2, wherein the vane is configured to apply a lesser damping force in the first rotational direction.

4. The bicycle rear derailleur of claim 3, wherein the vane comprises a first flow path to facilitate flow in the second rotational direction in order to limit the damping force in the first rotational direction.

5. The bicycle rear derailleur of claim 4, wherein the first flow path comprises a check valve.

6. The bicycle rear derailleur of claim 1, wherein the biasing element is disposed radially outward of the fluid cavity in relation to the rotational axis.

7. The bicycle rear derailleur of claim 1, wherein the guide wheel is located by the first guide fixing member.

8. The bicycle rear derailleur of claim 7, wherein the first guide fixing member is configured to axially compress at least one of the guide wheel and the chain guide assembly.

9. The bicycle rear derailleur of claim 8, wherein the first guide fixing member is a threaded bolt.

10. A bicycle rear derailleur, comprising:
    a base member mountable to a bicycle frame;
    a movable member movably coupled to the base member, the movable member comprising a fluid cavity configured to contain a volume of fluid;
    a closure mechanism configured to create a seal along a wall of the fluid cavity;
    a shaft configured to create a seal with an opening of the closure mechanism;
    a vane disposed on the shaft and configured to interact with the volume of fluid;
    a bias device configured to bias the shaft in a first rotational direction;
    a first guide member rotationally fixed to the shaft, disposed between the movable member and a freely rotatable guide wheel;
    a second guide member rotationally fixed to the first guide member such that the guide wheel is disposed between the first and second guide members; and
    a first guide fixing member configured to affix the second guide member to the shaft, the first guide fixing member contacting both the second guide member and the shaft, and
    a second guide fixing member configured to fix the first guide member to the shaft.

11. The bicycle rear derailleur of claim 10, wherein the bias device is configured to bias the shaft by imparting a bias force on the first guide member.

12. The bicycle rear derailleur of claim 11, wherein the second guide fixing member is configured to facilitate removal or replacement of the second guide member or the guide wheel without removal of the second guide fixing member.

13. The bicycle rear derailleur of claim 10, wherein the shaft and the guide wheel are rotatable about a rotational axis.

14. The bicycle rear derailleur of claim 13, wherein the first guide fixing member is threadably installable about the rotational axis.

15. The bicycle rear derailleur of claim 10, wherein the vane is configured to interact with the volume of fluid to resist movement in a second rotational direction, opposite to the first rotational direction.

16. The bicycle rear derailleur of claim 15, wherein the vane comprises a check valve configured to interact with the volume of fluid to reduce resistance to movement in the first rotational direction.

17. The bicycle rear derailleur of claim 10, wherein the guide wheel comprises a central portion, the central portion having a first guide wheel face abutting a shaft face of the shaft and second guide wheel face abutting a second guide member face of the second guide member.

18. The bicycle rear derailleur of claim 10, wherein the closure mechanism comprises a first seal and a second seal, the first seal configured to interact between a ring shaped component of the closure mechanism and the wall of the fluid cavity and the second seal configured to interact between the ring shaped component of the closure mechanism and the shaft.

* * * * *